US011714619B2

(12) United States Patent
Sandhupatla et al.

(10) Patent No.: US 11,714,619 B2
(45) Date of Patent: Aug. 1, 2023

(54) METHOD AND APPARATUS FOR RETAINING OPTIMAL WIDTH VECTOR OPERATIONS IN ARBITRARY/FLEXIBLE VECTOR WIDTH ARCHITECTURE

(71) Applicant: HUAWEI TECHNOLOGIES CO., LTD., Shenzhen (CN)

(72) Inventors: Amruth Sandhupatla, North York (CA); Ramshankar Ramanarayanan, Markham (CA); Boris Kravchenko, Mississauga (CA); Ahmed Mohammed Elshafiey Mohammed Eltantawy, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 221 days.

(21) Appl. No.: 17/125,304

(22) Filed: Dec. 17, 2020

(65) Prior Publication Data
US 2022/0197614 A1    Jun. 23, 2022

(51) Int. Cl.
*G06F 8/41*    (2018.01)
*G06F 9/30*    (2018.01)

(52) U.S. Cl.
CPC ........ *G06F 8/4435* (2013.01); *G06F 9/30018* (2013.01)

(58) Field of Classification Search
None
See application file for complete search history.

(56) References Cited

U.S. PATENT DOCUMENTS

| 5,175,856 | A  | * | 12/1992 | Van Dyke | G06F 12/08 717/124 |
| 5,327,561 | A  | * | 7/1994  | Choi     | G06F 8/433 717/157 |
| 7,673,296 | B2 | * | 3/2010  | Collard  | G06F 8/443 717/161 |
| 2008/0114970 | A1 | | 5/2008 | Colavin | |
| 2015/0268940 | A1 | * | 9/2015 | Baghsorkhi | G06F 8/452 717/160 |

(Continued)

FOREIGN PATENT DOCUMENTS

CN    103440229 A    12/2013

OTHER PUBLICATIONS

Rajkishore Barik et al, Efficient Selection of Vector Instructions using Dynamic Programming, 2010 43rd Annual IEEE/ACM International Symposium on Microarchitecture, Jan. 20, 2011, total 12 pages.

(Continued)

*Primary Examiner* — Marina Lee

(57) ABSTRACT

A method and apparatus to optimize a list of vector instructions using dynamic programming, in particular memoization, by generating a table containing instruction subvectors having individual (parts), contiguous (superparts) and repeated (broadcasts) lanes. Because the instructions in the table are subvectors selected to have individual, contiguous and repeated lanes in the registers, compiler optimizations can be enhanced. Introduction of such dynamic programming allows for speculative lane optimizations, as well as improved analysis-guided optimizations, either of which can be performed alone or in combination with other optimizations, whether or not they make use of dynamic programming.

17 Claims, 17 Drawing Sheets

(56) References Cited

U.S. PATENT DOCUMENTS

| | | |
|---|---|---|
| 2016/0371093 A1 | 12/2016 | Chang |
| 2017/0052768 A1 | 2/2017 | Gschwind et al. |
| 2020/0073662 A1* | 3/2020 | Rasale ................ G06F 9/30058 |
| 2021/0042099 A1* | 2/2021 | Bhandari ................ G06F 8/456 |
| 2021/0049016 A1* | 2/2021 | Ekanadham .......... G06F 9/3826 |

OTHER PUBLICATIONS

Samuel Larsen et al., Exploiting vector parallelism in software pipelined loops, Micro 38, Washington, DC, USA, 2005, pp. 119-129, IEEE Computer Society.

Samuel Larsen et al., Exploiting superword level parallelism with multimedia instruction sets, PLDI '00: Proceedings of the ACM SIGPLAN 2000 conference on Programming language design and implementation, New York, NY, USA, 2000, pp. 145-156, ACM Press.

Rajkishore Barik, et al., Efficient selection of vector instructions using dynamic programming. Proceedings of the 2010 43rd Annual IEEE/ACM International Symposium on Microarchitecture. IEEE Computer Society, 2010, 12 pages.

Ralf Karrenberg, "Automatic SIMD vectorization of SSA-based control flow graphs." (2014), 203 pages.

Wei Gao, et al. "Insufficient Vectorization: A New Method to Exploit Superword Level Parallelism." IEICE Transactions on Information and Systems, vol. 100, No. 1 (Jan. 2017), pp. 91-106.

\* cited by examiner

| Part or Superpart (including Broadcast Part) | Mask value |
|---|---|
| <x> | 0001 = 1 |
| <y> | 0010 = 2 |
| <z> | 0100 = 4 |
| <w> | 1000 = 8 |
| <x, y> | 0011 = 3 |
| <y, z> | 0110 = 6 |
| <z, w> | 1100 = 12 |
| <x, y, z> | 0111 = 7 |
| <y, z, w> | 1110 = 14 |
| <x, y, z, w> | 1111 = 15 |
| <x, x> or <y, y> or <z, z> or <w, w> | 0011 = 3 |
| <x, x, x> or <y, y, y> or <z, z, z> or <w, w, w> | 0111 = 7 |
| <x, x, x, x> or <y, y, y, y> or <z, z, z, z> or <w, w, w, w> | 1111 = 15 |

Fig. 2

Original Vector Instruction:

1110 —— %R1 = fadd A <$x_1, y_1, z_1, w_1$>, B <$x_2, y_2, z_2, w_2$>

Method 1:

1120
%R2 = fadd A <$x_1$>, B <$x_2$>
%R3 = fadd A <$y_1$>, B <$y_2$>
%R4 = fadd A <$z_1$>, B <$z_2$>
%R5 = fadd A <$w_1$>, B <$w_2$>

1130
%R6 = fadd A <$x_1, y_1$>, B <$x_2, y_2$>
%R7 = fadd A <$y_1, z_1$>, B <$y_2, z_2$>
%R8 = fadd A <$z_1, w_1$>, B <$z_2, w_2$>
%R9 = fadd A <$x_1, y_1, z_1$>, B <$x_2, y_2, z_2$>
%R10 = fadd A <$y_1, z_1, w_1$>, B <$y_2, z_2, w_2$>

Method 2:

1140
%R11 = extractelement %R1 <x, y, z, w>, 0
%R12 = extractelement %R1 <x, y, z, w>, 1
%R13 = extractelement %R1 <x, y, z, w>, 2
%R14 = extractelement %R1 <x, y, z, w>, 3

1150
%R15 = shufflevector %R1 <x, y, z, w>, Dummy <x, y, z, w>, <0, 1>
%R16 = shufflevector %R1 <x, y, z, w>, Dummy <x, y, z, w>, <1, 2>
%R17 = shufflevector %R1 <x, y, z, w>, Dummy <x, y, z, w>, <2, 3>
%R18 = shufflevector %R1 <x, y, z, w>, Dummy <x, y, z, w>, <0, 1, 2>
%R19 = shufflevector %R1 <x, y, z, w>, Dummy <x, y, z, w>, <1, 2, 3>

METHOD AND APPARATUS FOR RETAINING OPTIMAL WIDTH VECTOR OPERATIONS IN ARBITRARY/FLEXIBLE VECTOR WIDTH ARCHITECTURE

CROSS-REFERENCE TO RELATED APPLICATIONS

This is the first application filed for the present invention.

FIELD OF THE INVENTION

The present invention pertains generally to the field of image data processing and in particular, to a method for optimizing vector processing code such as that used by a graphics shader with an appropriate processing unit.

BACKGROUND OF THE INVENTION

For computer code written in a selected high-level language to be executed by a selected processor (it may be said that the instructions are "targeted" for execution on the processor), the code must first be compiled into low-level machine instructions. Many real work applications utilize a data type known in the art as a vector, which is essentially a one-dimensional array of numbers, which are known as "components" generally, and as "lanes" in the art. While a vector can have any number of lanes, in graphics processing, it often has four, and they are often labelled as <x, y, z, w>. A vector data type can be defined in high-level code, but certain processors can also provide direct hardware support. It follows that maintaining vectors and vector instructions from the high-level code down to the machine instructions is ideal and should be should be supported by development tools and compilers. In practice however, the code must be efficiently compiled to produce low-level code with optimal vector lane size (or) vector width as it gets translated from high-level to low-level code. The process of efficiently compiling vector code to have optimal vector widths is known as "lane optimization".

To allow code written with a chosen programming language to be executed on a chosen processor, a programmer can create a custom compiler using an infrastructure such as LLVM or GCC. These custom compilers are built to take code from a selected high-level language and to create an intermediate representation (IR) of the code that is specific to the infrastructure (LLVM-IR or GCC-IR). Once translated into IR level code, a variety of distinct optimization techniques, known in the art as "optimizations" can then be applied to the IR version of the code. This can improve the code's efficiency in one or more respects ("optimization" not requiring improvement in every way), before its translation into machine instructions. Finally, the optimized code can be translated into machine code that is specific to a chosen processor.

Throughout compilation, certain compilers can support various operations related to the extraction and permutation of vector components. These operations are known as "swizzling". Certain compilers can also maintain a static single assignment (SSA) form, which is a way of defining variables where each variable is defined exactly once. SSA is a method that greatly enhances the efficiency of certain optimizations performed at the IR level of compilation.

Despite the use of custom compilers, a compilation process using the available vector lane optimizations, can still result in machine code containing vector instruction deficiencies, even in combination with vector support in the programming language and a specialized processor. These deficiencies are generally known in the art of compiler design. Some examples are "dead lanes", which are lines of code that do not serve any useful purpose during execution; and "lane-common subexpressions", which is when multiple lanes of a vector undergo the same operation and therefore cause redundancies. Many other deficiencies exist. Thus, there is a need for implementing in a compiler, new optimization methods to better eliminate the deficiencies.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

Embodiments of the present invention address the optimization of vector instructions by using dynamic programming techniques. In particular, the problems addressed include dead lane elimination, shuffle elimination, constant lane analysis, partial lane combining analysis, lane-CSE (constant subexpression elimination), lane reduction, and others. Embodiments provide a method and apparatus to improve the efficiency of vector code. The method is implemented as at least one optimization process, applied to vector code during compilation, and in particular when the code is being processed by the compiler at the IR stage. Although examples throughout the description make use of LLVM compilers, embodiments of the present invention can be applied with any other compiler of vector code.

The present invention involves the use of dynamic programming techniques developed at the IR level of machine code generation, to improve upon the results of conventional optimizations. The proposed optimizations can be used as part of the compilation process, in addition to, before, or after conventional optimizations. The selection of which optimizations to use and in what order, depends on the user's selected optimization goal.

In an embodiment of the present invention, speculative lane optimizations and analysis-guided lane optimizations, both using dynamic programming, can be used to optimize a list of vector instructions. With a speculative lane optimization, a vector can be split into subvectors that can be used more efficiently in subsequent computations. The subvectors include the original vector's components individually ("parts"), the vectors containing only contiguous components of the original vector, and having a lesser or equal number of components ("superparts"); and the vectors made from identical components, each of which is a component of the original vector ("broadcast parts" or "splats"). Dynamic programming is used to store the subvectors into a table. The unused subvectors are then removed from the table, so as to prevent redundant code flow analysis and redundant creation of parts and superparts. A mask and mask value is associated with each of the subvectors. Then, duplicate instruction lanes are removed by having the subvectors in the table replaced with appropriately masked high-dimensional ones. Finally, for instructions that cannot be split, vectors are rebuilt into the required operand form. With an analysis-guided lane optimization, a greedy algorithm can be used to analyze the data flow of each instruction.

The methods disclosed, and their use of dynamic programming techniques, offer improvements over the current methods of dead lane elimination, shuffle elimination, constant lane analysis, partial lane combining analysis, lane- CSE, lane reduction, and other optimizations. The improvements include one or more of: the use of greedy algorithms in the analysis-guided methods that do not require searching for an optimal solution, the storage of only vector parts that are in contiguous memory locations to allow a GPU to operate at a higher performance, the use of table memorization to eliminate redundant computations, and the removal of duplicate instruction lanes to increase the code's efficiency. These are all techniques that help with the generation of a machine code having an increased speed of execution, a reduced code size, and a reduced number of registers used by the code. It is anticipated that the method can be useful with compilers of single instruction, multiple thread (SIMT) accelerators, and in particular those running on GPUs.

Embodiments of the present invention include methods of compiling computer instructions where a processor receives a set of computer instructions targeted for execution on a processor, each instruction for operating on at least one lane of an input vector having at least one lane; and applying to the set of computer instructions at least one lane optimization making use of dynamic programming techniques. The dynamic programming techniques include creating from a vector a table of subvectors, a subvector including at least one of a part including a single lane of the vector, a superpart including contiguous lanes of the vector, and a broadcast part including lanes having the same value as a lane of the vector. A lane optimization can be a speculative lane optimization, an analysis-guided lane optimization, or any combination of the two. Speculative and analysis-guided lane optimizations making use of dynamic programming are described herein.

The present invention includes a method of compiling computer instructions in which a set of computer instructions targeted for execution is received by a processor, each instruction for operating on at least one lane of an input vector having at least one lane; and applying to the set of computer instructions at least one compiler optimization that makes use of dynamic programming techniques. The method includes creating from a vector a table of subvectors, a subvector including at least one of a part including a single lane of the vector, a superpart including contiguous lanes of the vector, and a broadcast part including lanes having the same value as a lane of the vector. The table of parts, superparts and broadcast parts allows for more efficient optimizations, and consequently, enhanced performance at execution time.

Embodiments include a method of compiling computer instructions in which a processor receives a set of computer instructions targeted for execution on a processor, each instruction for operating on at least one lane of an input vector having at least one lane; and the processor applies at least one compiler optimization making use of dynamic programming techniques to the set of computer instructions.

Embodiments include a method of compiling computer instructions with dynamic programming techniques that include creating from a vector a table of subvectors, a subvector including at least one of a part including a single lane of the vector, a superpart including contiguous lanes of the vector, and a broadcast part including lanes having the same value as a lane of the vector.

Embodiments include a method of compiling computer instructions including applying at least one speculative lane optimization.

Embodiments include a method of compiling computer instructions including applying at least one speculative lane optimization that includes creating from an instruction vector a table of subvectors, the subvectors including at least one of a part, a superpart, and a broadcast part of the instruction vector; removing from the table of subvectors, the subvectors that are not required; creating for each subvector a digital mask that can identify the subvector, and that can recreate the subvector from the instruction vector; creating at least one mask, the lanes of which are a longest common subsequence of lanes from the digital masks of at least two subvectors; generating other subvectors of the table from the subvector having the mask with the longest common subsequence of lanes; and generating an output vector, from the subvectors of the table having useful lanes.

Embodiments include applying at least one speculative lane optimization where the output vector generated from the subvectors having useful lanes is generated from only the subvectors having useful lanes.

Embodiments include applying at least one speculative lane optimization, each of which is applied substantially in a same pass, the at least one optimization including at least one of: a dead lane elimination; a shuffle elimination, which refers to the elimination of at least one instruction, including shuffles, used to build vectors in the intermediate representation of a compiler; a constant lane analysis; a partial lane combining analysis; a lane common subexpression elimination, which refers to the elimination of redundant computations due to many lanes of a same vector undergoing same operations; a lane reduction; and at least one other optimization.

Embodiments include applying a speculative lane optimization that eliminates dead lanes resulting from phi functions, also known as phi nodes.

Embodiments include applying a speculative lane optimization that includes at least one threshold parameter allowing control over the degree of speculation, according to custom requirements.

Embodiments include applying at least one compiler optimization that is an analysis-guided lane optimization.

Embodiments include applying at least one analysis-guided lane optimization by: selecting an analysis-guided optimization; creating a mask vector for the computer instructions to be optimized, that corresponds to the selected analysis-guided optimization; creating with the mask vector the parts, superparts, and broadcast parts, that are to be used by the computer instructions causing the selected optimization problem; creating with the parts, superparts, and broadcast parts, the output of the computer instructions, as output parts, output superparts, and output broadcast parts; creating an output vector based on the output parts, output superparts, and output broadcast parts.

Embodiments include applying at least one analysis-guided optimization that is a shuffle elimination, and that includes: for each operand of a set of instructions, determining the largest subvector; and for each instruction, determining the subvectors based on its operands.

Embodiments include applying at least one analysis-guided optimization that is a constant propagation.

Embodiments include applying at least one analysis-guided optimization that is a constant propagation, where a constant is propagated during the same pass as when a mask is generated.

Embodiments include applying at least one analysis-guided optimization that is a constant lane analysis and includes, for each instruction: verifying each operand; creating for each operand a mask for the lane whose value is a constant number; calculating an instruction mask based on the operands; determining parts, superparts and broadcast parts of the instruction based on the instruction mask;

storing the instruction mask in a memory; and using, by the subsequent instructions, the instruction mask where it can be used.

Embodiments include applying at least one analysis-guided optimization that is a partial lane combining analysis and includes: identifying in the set of computer instructions, all occurrences where two instructions have a common lane; ensuring that for each occurrence of two instructions having a common lane, there are no lane conflicts with subsequent instructions using one of the two instructions having a common lane; creating parts, superparts and broadcast parts for the two instructions having a common lane, based on their common lanes; combining in a subsequent pass the parts, superparts and broadcast parts of the two instructions having a common lane, into resulting instructions.

Embodiments include applying at least one analysis-guided optimization that is a lane constant subexpression elimination (lane-CSE).

Embodiments include applying at least one analysis-guided optimization that is a lane constant subexpression elimination (lane-CSE) and includes: iterating over the instructions of a set of instructions; capturing the parts, superparts and broadcast parts, for each ShuffleVector, ExtractElement, and InsertElement instruction; iterating over the source operands of the instruction; iterating over the lanes; calculating a hash value where needed and capturing each hash value; calculating a hash value of the instruction across each lane using hash values of all of its source operands; applying a common subexpression elimination across all of its lanes; storing and capturing the hash values updated after the common subexpression elimination.

Embodiments include a computer processor operative to compile instructions, the computer processor including hardware support for at least one vector having an arbitrary number of lanes up to at least four, hardware support for the reading and extraction of individual vector lanes, hardware support for the reading and extraction of contiguous vector lanes, hardware support for the reading and extraction of broadcast vectors lanes; and the computer processor being operative for: receiving a set of computer instructions targeted for execution, each instruction for operating on at least one lane of an input vector having at least one lane; and applying to the set of computer instructions at least one compiler optimization that makes use of dynamic programming techniques.

Embodiments include a computer processor that is operative during compilation to apply dynamic programming techniques including creating from a vector a table of subvectors, a subvector including at least one of a part including a single lane of the vector, a superpart including contiguous lanes of the vector, and a broadcast part including lanes having the same value as a lane of the vector.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Further features and advantages of the present invention will become apparent from the following detailed description, taken in combination with the appended drawings, in which:

FIG. 2 is a table depicting mask values that can be used to identify the parts and subparts of a four-lane vector <x, y, z, w>, according to an embodiment.

FIG. 11 illustrates two (2) different ways of creating the parts and superparts of a four-lane vector called R1, according to an embodiment.

It will be noted that throughout the appended drawings, like features are identified by like reference numerals according to an embodiment.

DETAILED DESCRIPTION OF THE INVENTION

Figure 1:
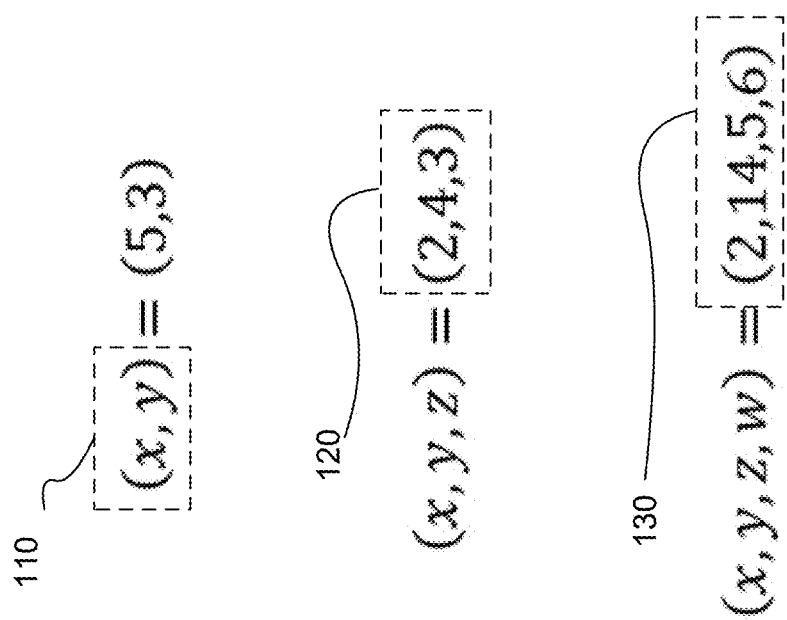
FIG. 1 illustrates a variety of vectors, according to an embodiment.

Embodiments of the present invention relate to optimization methods, also known simply as "optimizations", applied at the intermediate representation (IR) level of compiling for optimizing vector instructions, and in particular to optimizing methods making use of dynamic programming. In general, dynamic programming techniques involve problem-solving by recursion. In the context of a network, a high node breaks a problem into sub-problems, and sends each sub-problem to a lower node for solution. Each lower node has a choice to: (1) solve its sub-problem (using computation resources); or (2) look up the answer (which saves on computation resources but produces the same result or answer as solving); or (3) break the sub-problem into one or more sub-sub-problems, and send those off to lower nodes. If the decision is made to break the sub-problem into one or more sub-sub-problems, the node waits until the lower nodes solve their pieces, then it puts those pieces together to solve its particular sub-problem, then sends its solution to the higher node. The recursive aspect resides in the understanding that the problems can be broken into a finite number of parts, and eventually every node will find that it can either compute the answer to the problem before it, or look it up.

Accordingly, embodiments attempt to process an original vector instruction in a faster way than conventional processing by using such one or more dynamic programming techniques. Accordingly, in some embodiments, an original vector instruction is therefore split into a table (or set) of "simplified vector instructions" ("parts, superparts and broadcast parts"). When a further vector instruction (a vector instruction in which the original vector instruction is nested) requests the use of the original vector instruction, it will refer to the table of simplified vector instructions (choice "(2)" above), instead of the original vector instruction, because the set has been created and its use is faster than its recalculation. Because an original vector instruction can be nested into an indefinite number of further vector instructions, a typical program will involve recursion (i.e. instD (instC(instB(OriginalInst(x,y,z,w))))), each instruction of which can have a table).

During the compilation of executable code, a compiler can use a variety of optimization techniques to improve the efficiency of written code before its final translation to machine instructions. These optimizations are usually performed at the IR stage of a compilation process. If an optimization uses values that are assumed, or that come from a past execution, an optimization is said to be "speculative" and where vectors are involved, it can be referred to as a "speculative lane optimization", "lane" being an alternative expression for a vector "component". Many of the conventional optimizations that can be applied are based on a code analysis, and where vectors are involved, they can be referred to as "analysis-guided lane optimizations". Embodiments of the present invention include analysis-guided lane optimizations that unlike convention analysis-guided lane optimizations make use of dynamic programming.

In embodiments of the present invention, both speculative lane optimizations and analysis-guided lane optimizations can be performed, and they can be performed successively in any order. It should also be noted that either a speculative lane optimization or an analysis-guided lane optimization can be used alone, but they can also be configured to work in conjunction with each other. For example, a speculative lane analysis might only work on undecided instructions, and analysis-guided optimizations may be needed following a speculative lane optimization that is conservative in that it was set to only work on undecided instructions.

In embodiments of the present invention, dynamic programming techniques are programming techniques which can make use of a table to store the results of calculations, such that future calculations can be avoided by referring to the table result instead. The dynamic programming process of storing calculation results in a table for further use is known as "memoization".

Certain processors, in addition to operating on a single data item, can also be instructed to operate on a multi-lane vector, which is essentially a one-dimensional array of data items, to which certain mathematical operations, alone or in concert, can be applied. Examples of such mathematical operations can include or be readily represented as addition, multiplication, computation of vector products, as well as more elaborate or specialized combinations of operations. Operations can involve different kinds of data items, such as an entire vector or a lane of a vector. The operations may be directed by a set of computer instructions executed on a processor (and as a practical matter, such computations are best performed quickly and in great volumes, a task that is beyond general human capability). If operating on a single data item, a processor can be said to be a scalar processor, or a single instruction, single data (SISD) processor. When many arithmetic logic units (ALU) are combined in parallel, a single instruction can be executed simultaneously on multiple data items, and a processor having such architecture can be referred to as a single instruction, multiple data (SIMD) processor. A graphics processing unit (GPU) is a processor having an architecture that is specialized for SIMD operations, and in many cases for single instruction, multiple threads (SIMT). Although the most common application of GPUs has been for graphics processing, they can be used for a variety of applications making use of parallel computations.

A common application of vectors is to identify positions in real space, and when implemented on a GPU, they can be used to represent positions in graphical space. In graphics applications, a vector can include the three spatial coordinates, and a fourth coordinate to define a homogeneous coordinate. In other cases, a vector can include the three colors of the red-green-blue (RGB) color model, plus a transparency value. Collectively, the coordinates of a four-lane vector are commonly referred to as the "xyzw coordinates".

FIG. 1 illustrates three different vectors. Vector 110 has two components, x and y, also known in the art as "lanes". Vector 120 has three lanes, the first of which is defined as 2, the second 4, and the third, 3. Vector 130 has four lanes, the second of which is 14. In preferred embodiments of the present invention, an optimization pass occurs on IR-level vector code involving operations on four-lane vectors.

Some GPUs are especially designed to support vector operations, and have certain features that facilitate their use. One such feature is known as "flexibility" and refers to an architecture that has support for vectors having an arbitrary number of lanes, and especially vectors having any number of lanes up to at least four. Flexible vector support can also allow for different lanes to be executed either sequentially or in parallel.

Some preferred characteristics of a flexible vector architecture are: an optimized extraction of a single lane value, which is simply the reading of individual vector lanes; an optimized reading of vector lanes that are contiguous, and an optimized vector splat (broadcast) operation, which is the creation of a vector in which all the lanes have a same value.

A graphics shader is software used for processing vector-defined graphics and is usually designed for, and runs on, a GPU. However, many vector-based applications that are unrelated to graphics can also make use of graphics shader technology. The present invention is applicable to both graphics and non-graphics applications. Graphics shaders are often written in an application programming interface (API), some of the popular ones currently being OpenGL®, GLES™ and Vulkan®.

The vectors operated on by graphics shaders often define triangles that make up graphical object. Common shaders are therefore those that operate on vectors defining triangle vertices. These are known as vertex shaders and contain three spatial coordinates and one additional coordinate that can be used to define a homogeneous coordinate. Another common type of shader is a pixel shader, also known as a fragment shader. A fragment shader operates on vectors defining pixel attributes directly, instead of 3-dimensional triangles, but they also contain four components, which can be three colors such as red, green and blue (RGB) and a transparency.

With an API such as OpenGL for example, access to any one of a vector's components is accomplished via an operation referred to as "swizzling". The reason for this name is because access to a vector lane is accomplished with a command in which the lanes can be selected and rearranged, or "swizzled" (i.e. shuffled or permutated), in any order. As an example, suppose the 4-lane vector <a, b, c, d> exists and that it serves as an input vector. The swizzling command "newvector.bac" can be used to simultaneously select and rearrange lanes to create the output vector <b, a, c>. In other words, extraction of lanes to form a new vector can create a new vector having the original lanes in any new order, and even with a different number of lanes. This provides much flexibility in manipulating vectors. Generally, a swizzle operation allows a graphics developer to think with better abstraction while writing mathematical formulae, without having to deal with alternatives such as the structures found in the C programming language.

For code written in a selected high-level language to be processed with a selected processor, the code must first be compiled. Because vector data types can be defined in high-level API code, and can also have direct hardware support in an appropriate GPU, it follows that maintaining vectors and vector instructions from the high-level code down to the machine level instructions is ideal and should be possible. For this to be possible however, the code must be efficiently compiled as it gets translated from higher level to lower level code.

In an embodiment of the present invention, a compiler first takes code from a selected high-level language and creates an intermediate representation (IR) of the code. A variety of distinct optimization techniques (optimizations) can be applied to the IR version of the code. Then, the optimized code can be translated into machine code language specific to the chosen processor. Through compilation, a compiler can easily support various operations related to the extraction and permutation of vector components, and can also maintain a static single assignment (SSA) form. The SSA is a method that greatly enhances the efficiency of certain optimizations performed at the IR level of compilation.

In embodiments of the present invention, a primary objective is to enhance the results of machine code generation by eliminating certain deficiencies than can occur during compilation. These eliminations can include "dead lane elimination", which is the elimination of lines of vector code that do not serve any useful purpose during execution; "lane common subexpression elimination" (lane-CSE), which is the elimination of redundant computations due to many lanes of a same vector undergoing the same operations; "lane-reduction", which is to verify whether lanes of a vector undergo computations that are common to lanes of a same or another vector, and eliminate the redundant computations; and loop-invariant lane motion, which is to move out of loop vector operations when it does not affect the semantics of the program. In embodiments of the present invention, such optimizations can be achieved by using algorithms based on dynamic programming techniques developed for code at the IR level. These optimization algorithms can be used in both speculative optimization methods and analysis-guided optimization methods.

In embodiments of the present invention, a GPU designed to support vector operations can be used and its architecture can be flexible such as to have support for vectors having any number of lanes up to at least four. It can also allow for different lanes to be executed either sequentially or in parallel.

In embodiments of the present invention, it is observed that a vector used in a graphics shader is usually limited to having four lanes, and in any case, always has a limited number of lanes.

From an input vector, new vectors and subvectors can be generated, and a set of such new vectors and subvector can be defined to include only vectors and subvectors meeting certain conditions. In embodiments of the present invention, a set of new vectors and subvectors can include the vector lanes individually, herein called "parts", new vectors and subvectors made from lanes that are contiguous in the input vector, and that have an equal or shorter length than the original vector, and new vectors and subvectors in which the lanes are the same as each other, and the same as a lane of the input vector, herein called "broadcast parts". In embodiments of the present invention, the vectors and subvectors having contiguous lanes of the input vector, and the broadcast parts, are collectively known as "superparts". Further, the term "subvector" can include any of the parts and superparts defined above, even if it contains as many lanes as the original vector.

In embodiments of the present invention, for a vector having four lanes, denoted as <x, y, z, w>, the set of parts and superparts as defined above is of special interest because when an appropriate processor is selected, it includes only vectors that can readily and efficiently be obtained from an input vector.

FIG. 2 illustrates the parts and superparts 210 of a four-lane vector. The subvectors having a single lane are called "parts" 230, and the remaining ones are called "superparts" 240. Those having only duplicate values can be called "broadcast parts" 250 and be considered to be a subset of the superparts.

Because of the restrictions on an original vector's size, which can be four lanes, there is also an upper bound to the number of parts and superparts that can be created from an input vector. Accordingly, there is an upper bound as to how many different ways a vector can be swizzled.

In embodiments of the present invention, the superparts are made of vector lanes of the input vector which are in contiguous or same memory locations, because accessing contiguous memory locations can result in better performance on appropriate SIMT hardware, such as certain GPUs.

Once the parts and superparts 210 of a vector have been created, the dynamic programming technique of memoization can be employed to create at least one table in which to store them. If subsequent instructions call for swizzling operations on an input vector, instead of analyzing the instructions and re-creating relevant parts and superparts, an algorithm can choose the corresponding parts or superparts from the memoization table and replace the operation on input vector with the corresponding parts or superparts. By doing so, redundant computations for parts and superparts creation can be eliminated. For instructions accessing non-contiguous locations, scalarization of an input vector can be used instead, where scalarization is simply to break the input vector into its separate lanes.

In the specific case of a dead code elimination optimization, embodiments of the present invention can make use of a conventional dead code elimination pass to remove the unused parts and superparts from their memoization table, and this can ensure the elimination of dead lanes. On a broader scope, an embodiment of the present invention can perform the dead lane analysis on a full function or a full program.

Once the parts and superparts of an original vector have been created, conventional analysis-guided optimization methods can also be used to optimize vector code for a given GPU. These can include dead lane elimination, shuffle elimination, constant lane analysis, partial lane combining analysis, lane-CSE, lane reduction, and others known by a person of ordinary skill in the art of compiler design. Further, a greedy algorithm can be introduced, which can analyze the data flow of each instruction.

An analysis phase as above can create a set of parts and superparts for each instruction, such that each instruction can be linked to one or more parts and superparts encoding the required transformation. Through a data flow analysis, the parts and superparts can be generated based on how an input vector is used by an instruction.

With a speculative lane optimization, an implied assumption is that if an input vector is used in parts and superparts, and not as a whole, then it is likely beneficial to split the input vector into parts and superparts having the granularity speculated to be used by instructions. For example, it might be beneficial to split a 4-lane vector into 1 superpart having 3 lanes, and 1 part having 1 lane, because that is how the vector is speculated to be used in the instructions. Another example would be to split a 4-lane vector into 1 superpart having 2 lanes, and 2 parts, each having 1 lane. A follow-up optimization can then be done in accordance with that particular splitting.

A speculative lane optimization has benefits and drawbacks. One benefit is that it is not related to a specific deficiency, and therefore relies on a single and simple analysis. It also requires minimal target-specific knowledge. A drawback however, is that when trying to match the instructions, a speculation can be either very careless, or alternatively very conservative, and this depends on how it is programmed. For example, splitting an input vector into one superpart and two parts is not beneficial, when a splitting in two superparts would be sufficient.

In an analysis-guided lane optimization, determining the optimal splats that will be used by instructions, where a splat is a vector having a same value for all its lanes, can be based on a given standard analysis, such as a dead lane elimination, shuffle elimination, constant lane analysis, partial lane combining analysis, lane-CSE, lane reduction, and others. Given a specific optimization problem and a given target, the determination of optimal splats can be based on whether or not it is beneficial to split the vector, and the decision to split the vector can be based on that alone.

For example, if a target processor supports a fused multiply-add (FMAD) instruction, which combines multiplication and addition in one operation, then a partial lane combining analysis can find it to be beneficial for a floating multiply instruction (fmul) to be split into 2 superparts, each having 2 two lanes (2 splats in total), instead of splitting it into 1 superpart having 2 lanes, and 2 parts each having 1 lane (3 splats in total).

As with a speculative lane optimization, an analysis-guided lane optimization has benefits and drawbacks. For each optimization goal, a different analysis may be required. These analyses include the various optimizations that are known by a person of ordinary skill in the art of compiler design. For a given domain of applications, it can be that not all analysis types are required and using some can be a burden or unnecessary. Since an analysis-guided lane optimization typically uses a global mask vector to identify which lanes of an input vector are used by the instructions, it loses information on how each lane is being used. Hence, to generate the appropriate parts and superparts with an analysis-guided lane optimization, an additional lookup through all the instructions is required. This is a problem that can be avoided by using speculative analysis. Since the speculative lane technique can create all possible combinations of parts as soon as it visits a vector, it can replace instructions with appropriate parts and superparts "on the fly". On the positive side, an analysis-guided lane optimization has the potential to provide the global vector splats that are optimal for the chosen optimization, because it can implement and perform all the required additional analysis.

Figure 3:
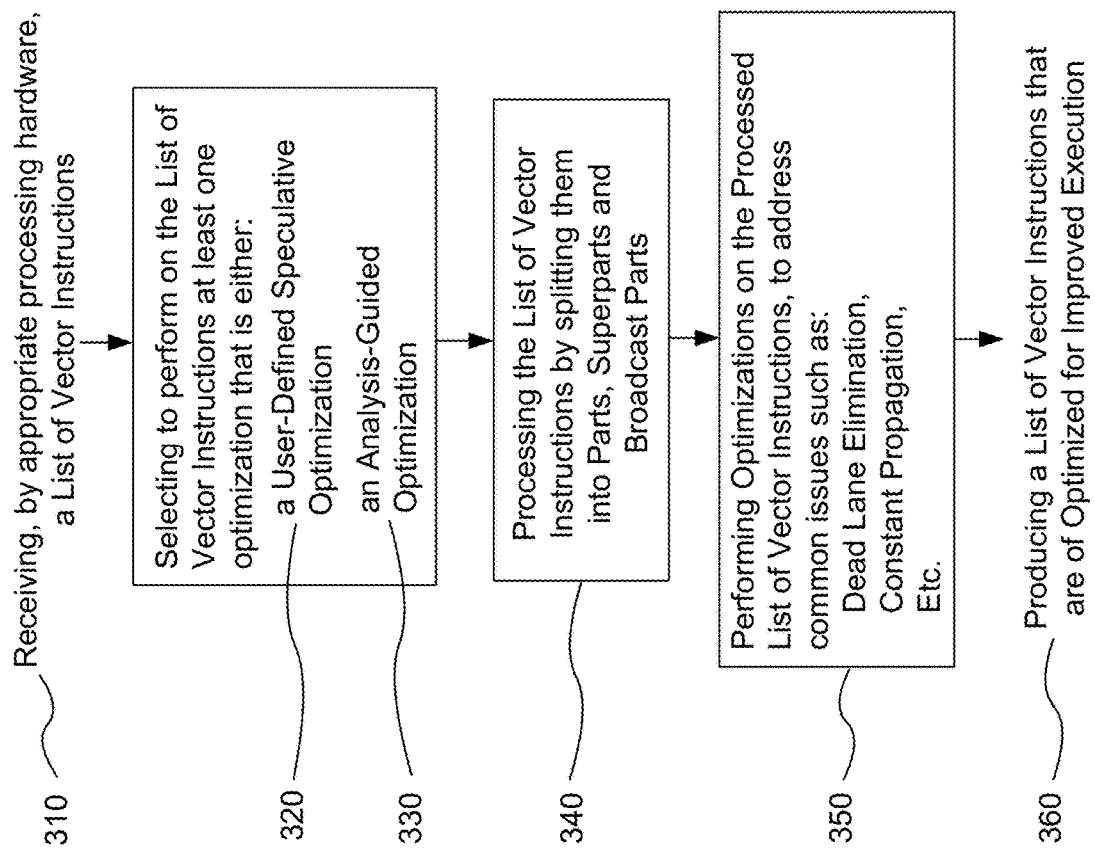
FIG. 3 illustrates an overview of a complete method to optimize vector instructions, where any number of optimization techniques can be used, according to an embodiment.

FIG. 3 illustrates an overview of the steps involved in an embodiment of the present invention. Given a list of vector instructions 310 in an IR form, at least one lane optimization can be performed on them. The lane optimizations can include at least one of a conventional optimization and an optimization based on dynamic programming, and the order in which optimizations are performed can be modified. The lane optimizations can include at least one of a speculative lane optimization 320 and an analysis-guided lane optimization 330. Either of the two can be performed on the list of vector instructions 310. At this step, a speculation is generally user-defined. In some embodiments, at least one analysis-guided lane optimization can be performed before a speculative lane optimization, and in other embodiments, a speculative lane optimization can be performed before at least one analysis-guided lane optimization. The order in which optimizations are performed is an option of the user and it can depend on an optimization goal. The sequence of at least one optimization process results in the generation of at least one set of parts and superparts, based on the list of vector instructions 310. Following this, a table of parts and superparts is created for each instruction operating on an input vector 340. Optimizations can be then be performed, including dead lane elimination, shuffle elimination, constant lane analysis, partial lane combining analysis, lane-CSE, lane reduction, and others 350. The global result of a method is a list of optimized vector instructions 360.

Figure 4:
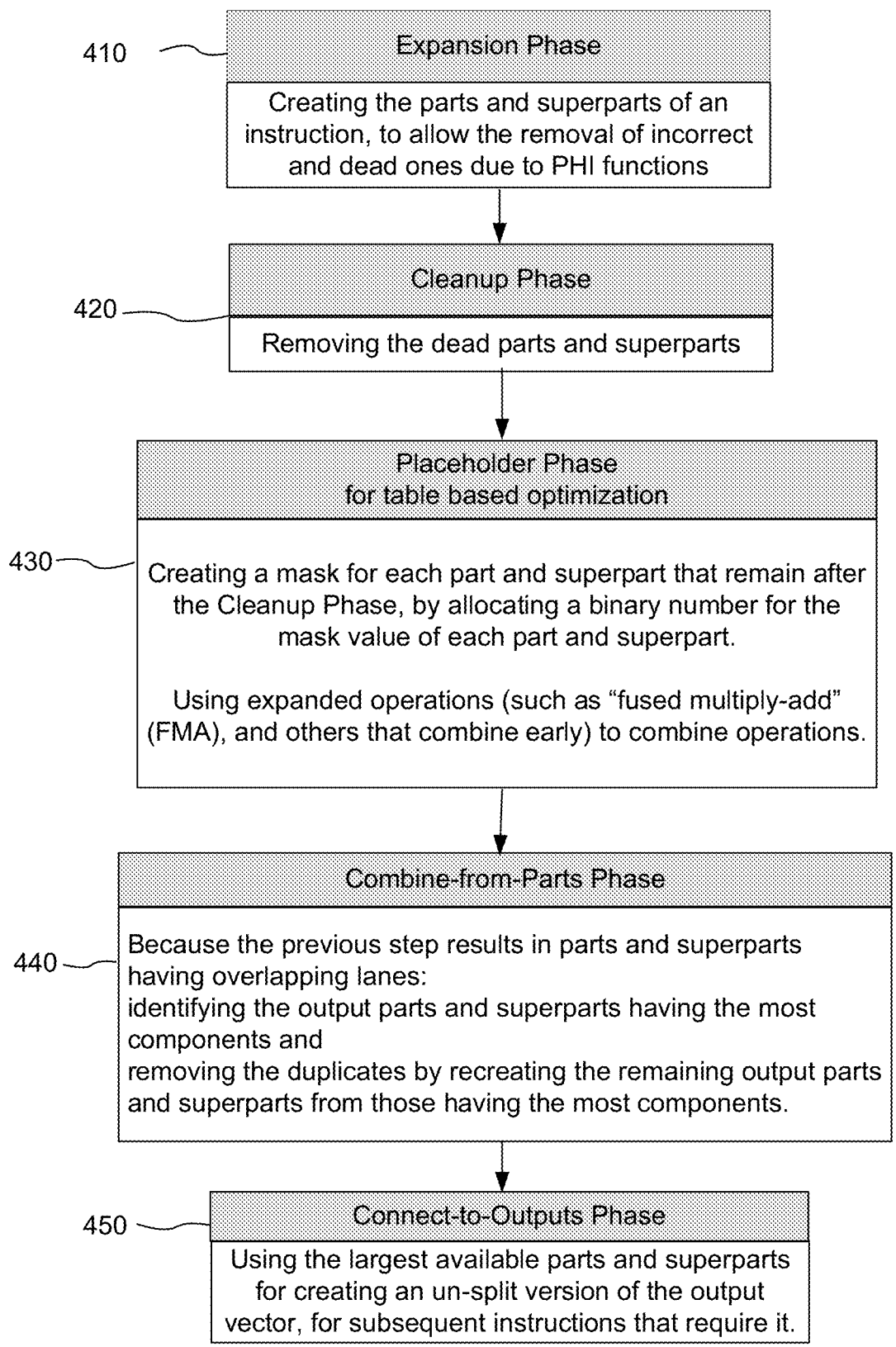
FIG. 4 illustrates an overview of a speculative lane optimization, employing dynamic programming techniques, according to an embodiment.

FIG. 4 illustrates a speculative lane optimization method using dynamic programming, which consists of a sequence of phases to process a vector instruction during a machine code generation process, such that the code can be executed with increased efficiency. During an Expansion Phase 410, parts and superparts are created from the vector instruction. Some of these are incorrect or dead due to phi functions. A phi function (also known as a φ function, phi node, or φ node) is a function which selects a new definition for a variable, based on the variable's past control flow. For example, if y=x, but x can be either $x_1$ or $x_2$, depending on a prior conditional statement such as "if a >0, x=$x_1$, else x=$x_2$", then y can be written as y=φ($x_1$, $x_2$), which means that y has the value of x that resulted from the conditional statement "if . . . else". The code involving the alternate condition, however, becomes dead code which clutters the set of instructions. Therefore, during a Cleanup Phase 420, the parts and superparts that are dead because of phi functions and/or other reasons can be removed. Next, a Placeholder Phase 430 can use dynamic programming to create a table for storing all the possible valid parts and superparts of instruction results. Each part and superpart can be identified by a part number which can be a mask value. In an embodiment using LLVM, the table can be used by LLVM's "SelectionDAG" code generator (DAG: dynamic acyclic graph). Expanded operations such as "fused multiply-add" (FMA), and others that combine early, can be used. A "Combine-from-Parts" Phase (including parts and superparts) 440 can then follow the Placeholder Phase. Parts and superparts having common lanes cause duplicates to exist in the table. The table can therefore be modified to be based on the largest subvectors, and the smaller subvectors can be rebuilt from those largest subvectors. A last step in a speculative lane optimization can be a "Connect-to-Outputs Phase" 450. Since some of the subsequent instructions can require that a vector not be split, the largest available parts and superparts can be used to rebuild an original vector (un-split).

In embodiments of the present invention, a speculative lane optimization can be applied before or after any number of similar or different analysis-guided lane optimizations.

An embodiment of the present invention can be used to process an operation such as a swizzling operation, from a high-level input code to a lower-level output code.

As an example, the code for original vector instructions can be written in a pseudo code language similar to the C language and a swizzling operation can be on the x and y lanes of a 4-lane vector. In such a case, a compiler of the present invention can maintain the vector lane values as SSA registers in the IR. However, the connection between the SSA register holding vector lanes, and the original "struct" data type, is not visible in the IR, except for when they are first loaded, and just prior to being unloaded.

Translating a vector swizzle operation from a high-level input code to a lower-level output code can pose an optimization challenge. An example is when a whole vector is passed through a loop, except that a few of its lanes are modified. It makes for more optimal code if the vector lanes used in the loop are extracted before going through the loop. However, in an embodiment where a compiler is based on LLVM, GCC, or another one of the common infrastructures, the compiler offers only a limited set of swizzling operations in its IR. For instance, a lane can be extracted using either a constant or a dynamic index, by using the "extractelement" LLVM instruction, or it can be shuffled using a constant lane mask, by using the "shufflevector" LLVM instruction.

In a case where lanes are extracted, recombining the vectors can be done with a shuffling instruction or otherwise with an insertion instruction. In an embodiment based on LLVM, an "insertelement" instruction can be used with either a constant or a dynamic index. These lane operations can exist alongside the SSA form and experience has shown that even when standard SSA optimizations are enabled, there are still situations where machine instruction moves resulting from "insertelement" and "shufflevector" instructions, are not coalesced or otherwise removed, resulting in poor code generation.

An example of where such code generation can occur is when an SSA phi node is passed through a swizzling operation via an "insertelement" LLVM instruction. In an embodiment of the present invention, an optimized solution can be provided by removing the unnecessary moves and dead lanes. Then, a synthesized benchmark code using a swizzling operation can be provided and the result can be written back to the output vector.

Figure 5:
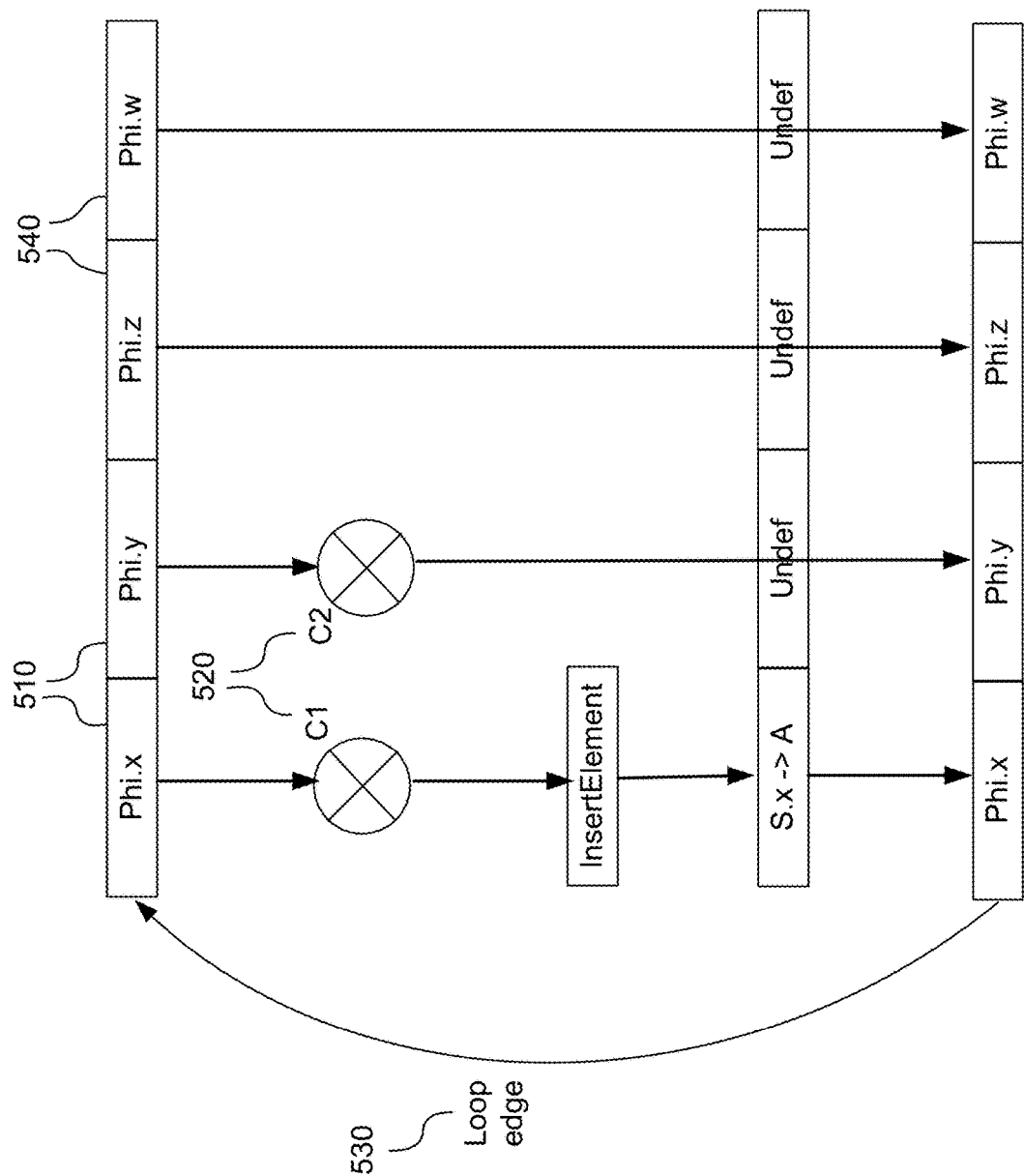
FIG. 5 is a pictorial representation of IR code flow that is unoptimized because two dead lanes going through a loop according to an embodiment.

FIG. 5 illustrates unoptimized IR code flow highlighting dead lanes. Only two lanes, x and y 510 of a phi node instruction are being added with constants C1 and C2 520. It also includes a loop back edge 530 from the resultant vector to the source phi node. Lanes z and w 540 are not being used by any other operation and yet, they are active in the loop. Despite these lanes being redundant and causing unnecessary copying instructions, the current LLVM-IR function level optimizations have not been found to be reliable in recognizing them. In an embodiment of the present invention, a code of vector instructions can be optimized by having dead lanes z and w eliminated from the loop and added back to the resulting output vector after the loop has been completed.

Figure 6:
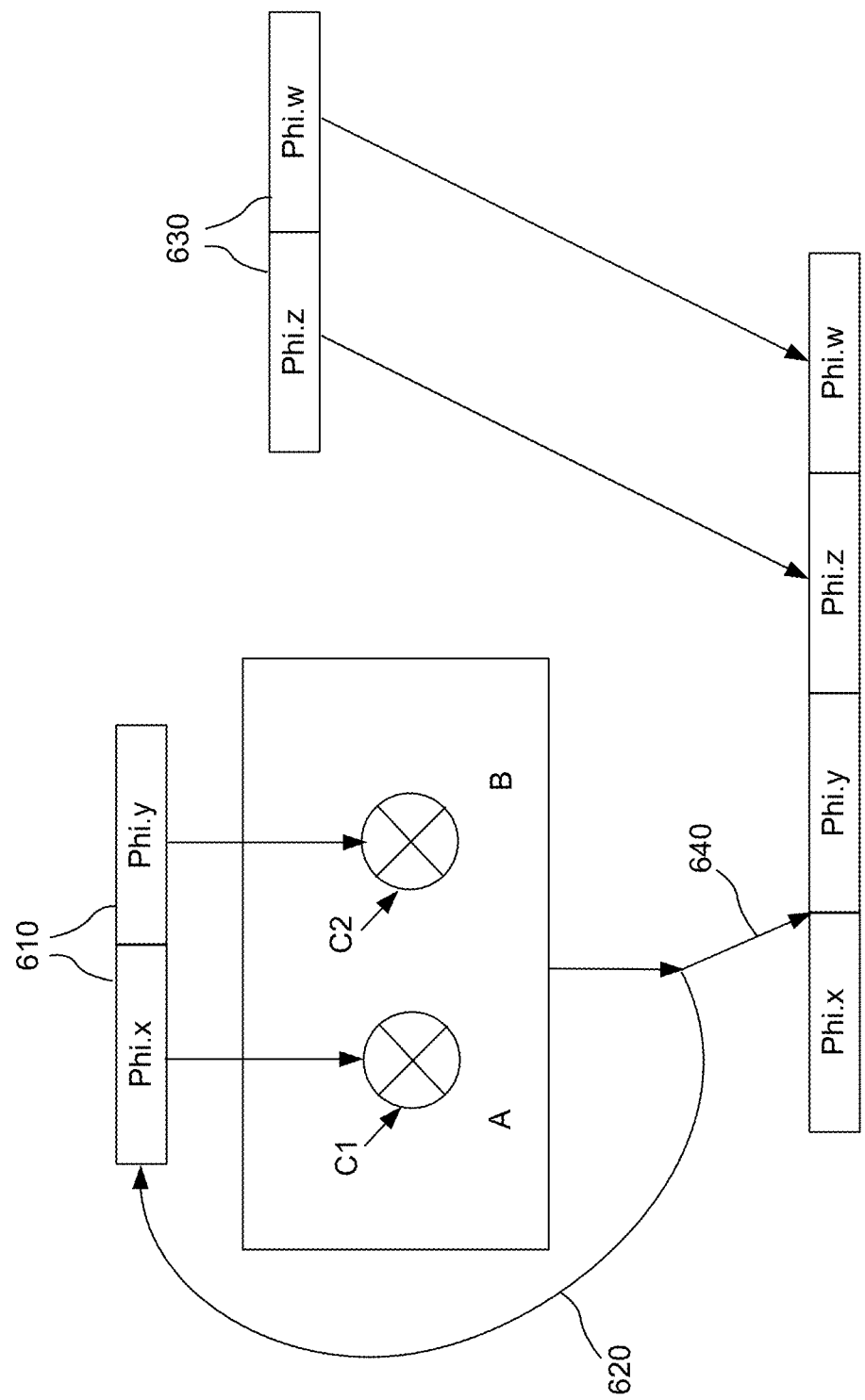
FIG. 6 is a pictorial representation of IR code flow in which no dead lane is going through a loop because it has been optimized according to an embodiment.

FIG. 6 illustrates a similar IR code flow where the active lanes x and y 610 are recognized and made active in the loop 620, whereas dead lanes z and w 630 are added back to the resulting or output vector, only after the loop has been completed 640.

In an embodiment of the present invention, OpenGL® is used as an API for synthetic graphics. The code contains a four-lane vector named "gl_Position", and a looped operation is to be performed on its y-lane. The looped operation can be an addition operation to the y-lane, iterated in a do-loop.

In an unoptimized version of the code named version-1, the vector is first defined. However, its lanes can be thought of as SSA variables and, because a single value needs to be modified (the y-component), there is no need to rebuild all of the lanes after each do-while iteration. Building the "gl_Position" vector can actually be delayed until the do-while iterations have been completed, and lane values can be maintained in SSA registers.

In an optimized version of the code named version-2, the looped operation is done on the y-component only, and only after the looped operation is completed, is the gl_Position vector built. This represents an optimization in that the version-1 code requires a 4-lane vector register to be allocated before the do-do-while loop, while the version-2 code needs only a 1-lane vector register before the do-while loop. In particular, because the version-1 code may use wider registers than the version-2 code, the latter represents an improvement in terms of efficiency.

There are typically two ways a compiler author can use to support graphics library (GL) API vectors, and swizzling. One approach is to disregard the API-level vectors (i.e. to treat the API-level vectors as syntactic sugar), and to scalarize the vector extracts and shuffles in the abstract syntax tree (AST) or in the IR. Another approach is to retain the API vectors in the IR and to optimize the shuffles and inserts in the IR. The latter is a viable option when the underlying hardware supports a native arithmetic logic unit (ALU) or special floating-point (FP) operations on API-width vectors.

As for the first approach, scalarizing vectors requires the subsequent use of Basic Block-vectorization (BB-vectorization) or Superword-Level-Parallelism-vectorization (SLP-vectorization), in order to re-combine the scalars into vectors and improve performance. However, scalarization offers a trade-off in that combining operations together isn't required when a single lane or only part of a vector is modified. Scalarization splits the lanes and thus all operations related to vector swizzling in the compiler's IR are eliminated. Experience has shown that IR-level scalarization is not needed when the underlying graphics hardware supports a full or partial subset of native vector operations. In addition, such hardware also offers free or inexpensive lane extractions, shuffles and broadcast operations. New optimizations need to be applied however, to optimize lane extractions and combinations.

In some embodiments of the present invention, the hardware used can include a GPU supporting full or partial subsets of vectors, as well as several register types, including lane access. Hardware allowing inexpensive access to contiguous partial lane is particularly advantageous.

In an embodiment, a vector R has lanes R0, R1, R2 and R3, and instructions are as follows:

For a single lane such as $R_0$:
 The instruction "mov tmp0, R0" moves lane $R_0$ from vector R to a temporary register.
For contiguous lanes such as $R_0$ and $R_1$:
 The instruction "mov tmp0:tmp2, R0:R1" moves $R_0$ and $R_1$, from R to temporary registers.
For non-contiguous lanes, such as $R_1$, $R_3$, $R_0$:
 The ":" operator cannot be used. Hence, hence three moves are needed for the three lanes to be moved.

Some hardwares, including certain processors and GPUs, have been designed in such a way that accessing lanes and contiguous lanes is inexpensive, whereas accessing non-contiguous lanes requires several extra "mov" instructions. On the other hand, some architectures can require special instructions to pack and unpack a vector. For example, in an X86 architecture, extraction of a middle lane requires a real instruction set architecture (ISA) instruction. An XMM0 register has four (4) lanes and to access any one of them, a real instruction (such as "shufpd", unpackpd, etc.) must be used. With appropriately designed hardware, lanes are accessible without an ISA instruction, because vectors are addressed using a sequence of registers, instead of a single one.

In embodiments of the present invention, applying a swizzle operation can create dead lanes and thus an opportunity for them to be removed.

Figure 7:
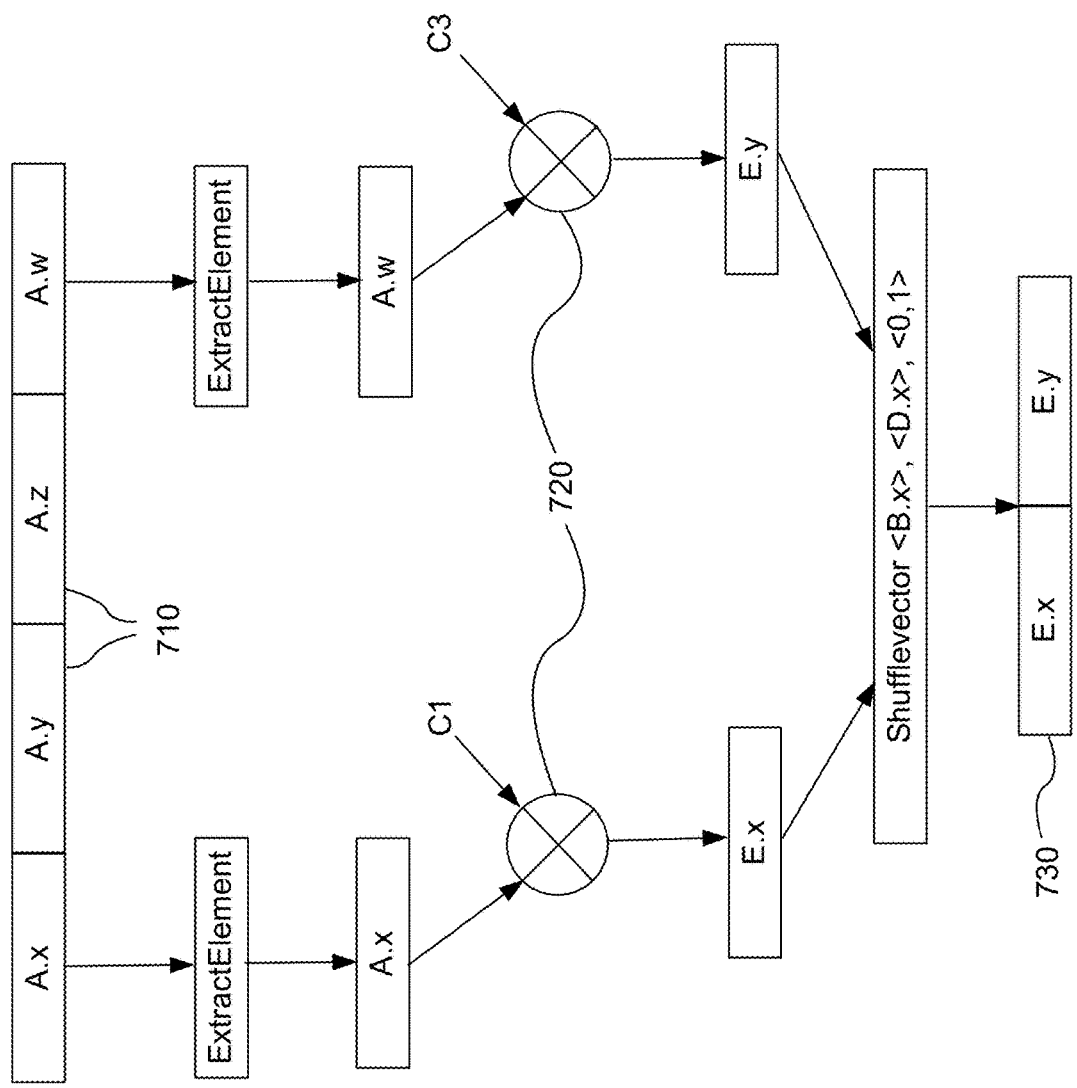
FIG. 7 is a pictorial representation of IR code flow, where a four-lane vector is passed through Extractelement and Shufflevector instructions and shows that two out of four lanes of an input vector are dead according to an embodiment.

FIG. 7 illustrates an IR-level graph flow of an embodiment where a four-lane vector is passed through instructions similar to LLVM's "extractelement" and "shufflevector". The figure highlights that two out of four lanes, namely A.y and A.z, are dead 710. Embodiments of the present invention aim to eliminate such dead lanes, in order for the resulting machine code to be optimized and run faster when executed.

In embodiments of the present invention, FIG. 7 shows that lanes y and z are dead lanes. Hence, these dead lanes can be omitted from the IR. With regards to active lanes x and w, they are being added to constants C1 and C3 720, and the results are joined together as a new vector whose size is two (i.e. it has 2 lanes) 730.

Figure 8:
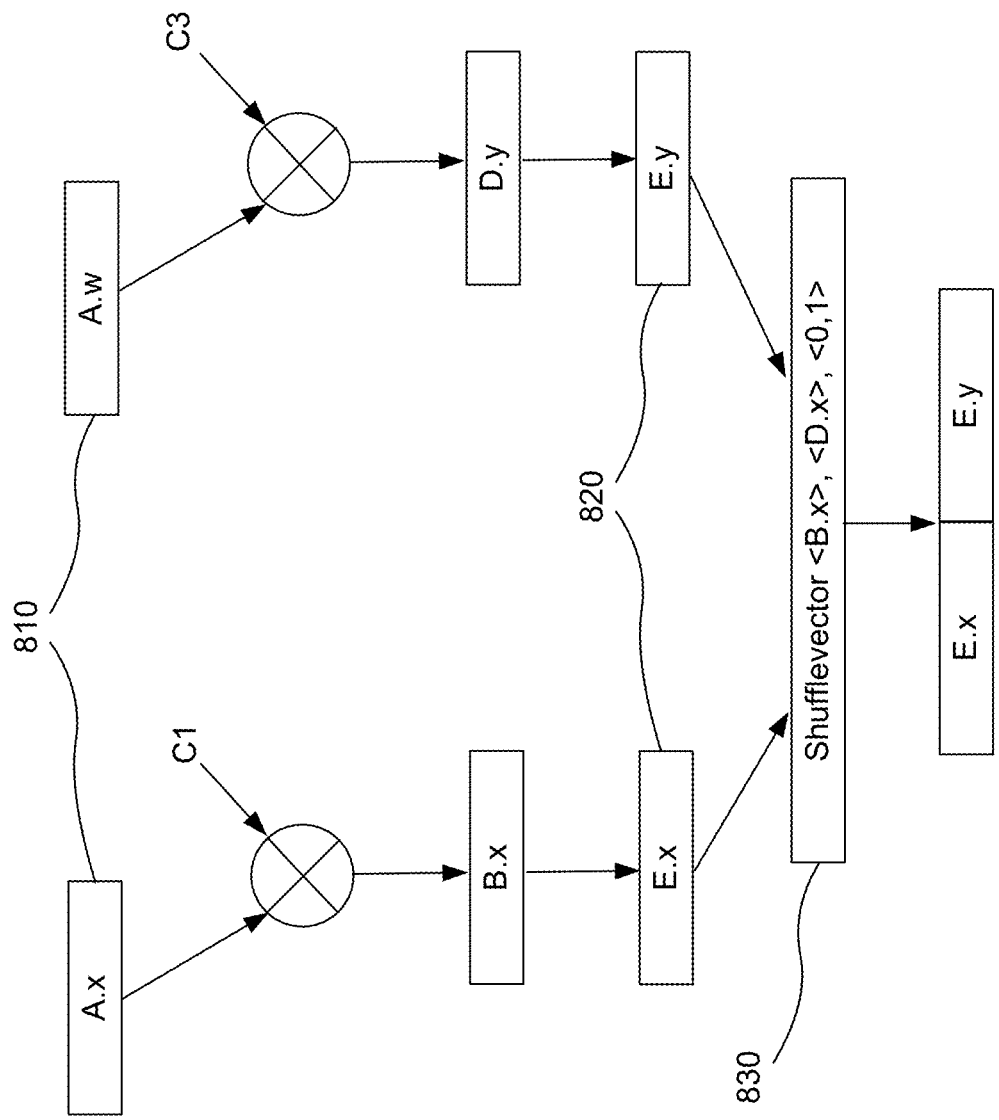
FIG. 8 is a pictorial representation of IR code flow, where the code of FIG. 7 has been optimized by having the dead lanes eliminated according an embodiment.

FIG. 8 illustrates an IR-level graph flow, where the code flow has been optimized by having the dead lanes eliminated, using an optimization. The extracted lanes A.x and A.w 810 are not contiguous, and hence a result vector is first obtained in a scalarized form 820. An instruction such as, or similar to, LLVM's "shufflevector" instruction 830 can then be applied.

Figure 9:
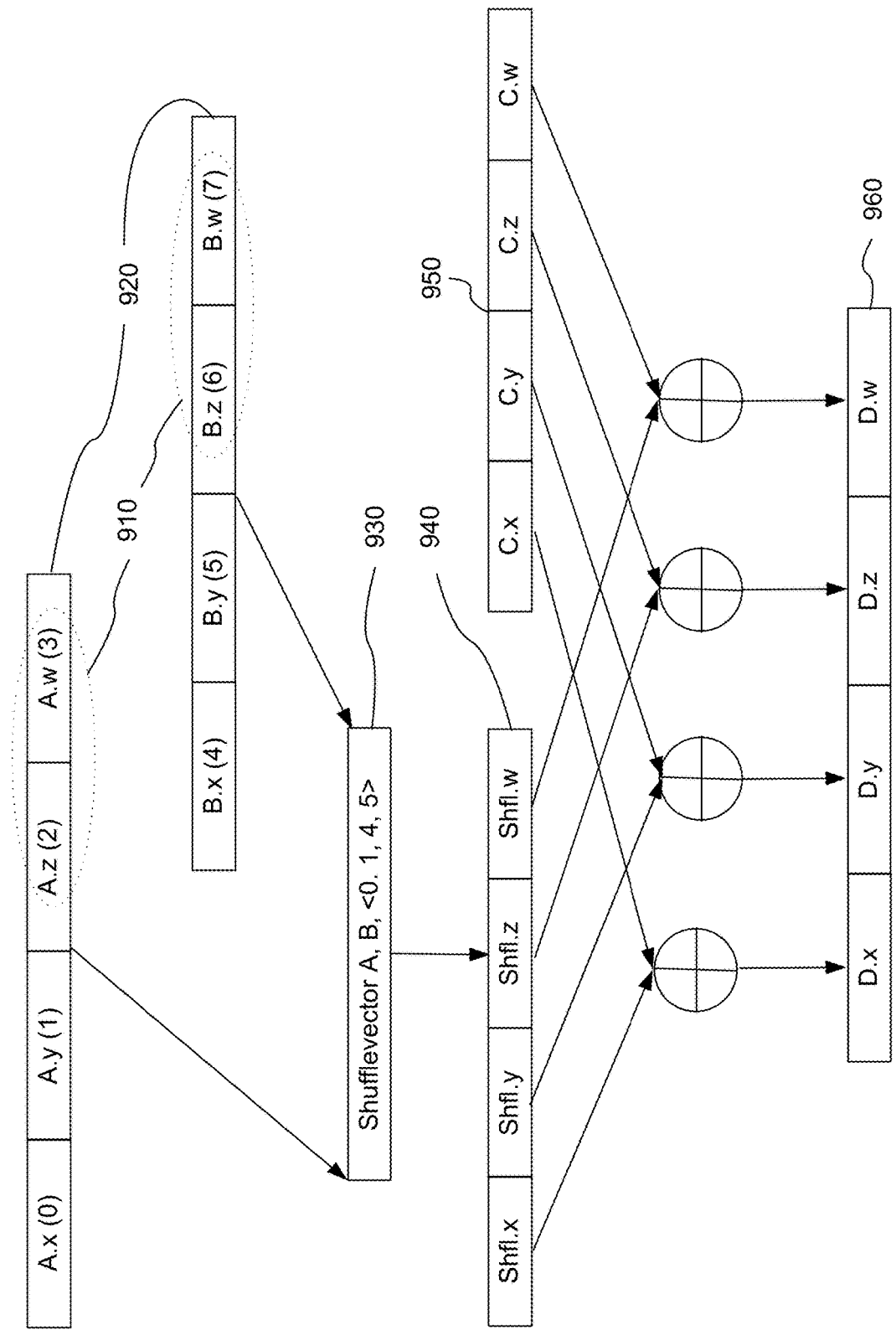
FIG. 9 is a pictorial representation of IR code flow, where two (2) vectors are going through a "Shufflevector" instruction according to an embodiment.

FIG. 9 illustrates an embodiment of the present invention in the form of an IR graph flow of two (2) vectors going through an instruction similar to LLVM's "shufflevector" instruction. The figure highlights two (2) dead lanes 910 for each one of input vectors A and B 920. Partial contiguous lanes from two vectors are being extracted and then added to one another. Here, a "shufflevector"-like instruction 930 takes the first two lanes of vectors A and B and forms vector Shfl 940. Later, vector Shfl 940 is added to vector C 950, producing the final result vector D 960.

In the embodiment of FIG. 9, for each one of vectors A and B, the contiguous lanes x and y are active, and the lanes z and w are dead. One way to optimize the vector Shfl 940 is to split the addition operator into two (2) additions. The performance loss due to splitting may be less than with an actual "mov"-like instruction. Also, when a processor offers overlapping register files and free vector extraction, it may be more appropriate to take a conservative approach to splitting whenever possible.

Figure 10:
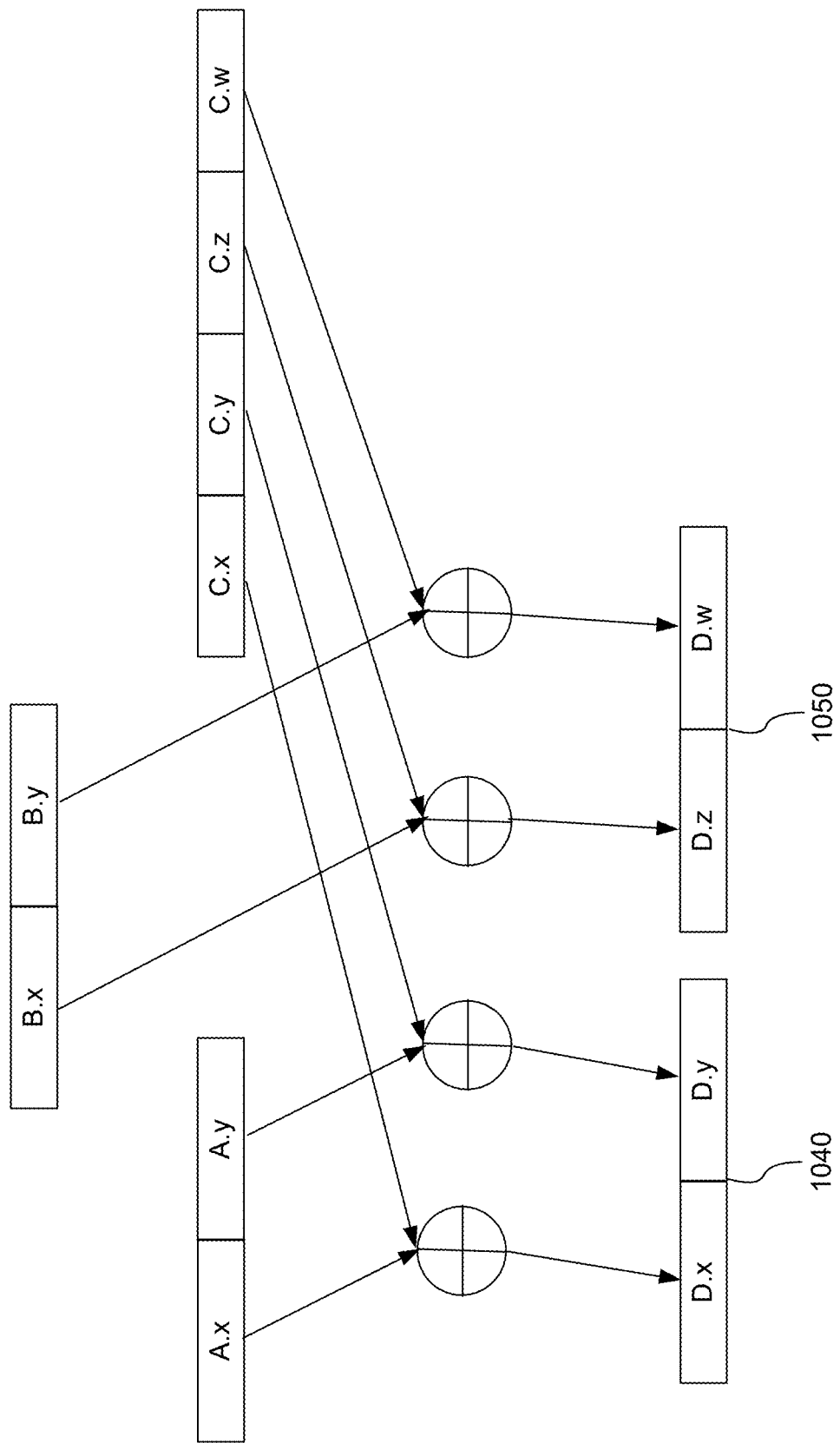
FIG. 10 is a pictorial representation of IR code flow, where the code of FIG. 9 has been optimized by having dead lanes eliminated according to an embodiment.

FIG. 10 illustrates a code flow as in FIG. 9, but optimized by having dead lanes 910 eliminated.

In some embodiments, the problems of optimizing away extraneous shuffles and dead lane can be addressed with a dynamic programming solution. In general, because compilation is often performed on a remote server, dynamic programming may sound impractical from a complexity point of view. However, because embodiments typically utilize API vectors having a maximum of four (4) lanes, and because typical shaders are rather small, the upper bound is manageable in a dynamic programming process. A notable feature of the algorithm of the present invention is that it supports a static single assignment intermediate representation (SSA IR).

Referring again to FIG. 4, in an embodiment of a speculative vector lane optimization algorithm of the present invention, an Expansion Phase 410 is responsible for creating parts and superparts for all instructions supported in the supporting GPU hardware.

FIG. 11 illustrates an instruction, as well as the parts and superparts that can be generated from that instruction. In particular, it depicts two (2) different ways of creating the parts and superparts for an instruction vector R1, where an assumption is that R1 is a 4-lane wide vector.

In FIG. 11, vector % R1 1110 is an original instruction vector, and two methods to create its parts and superparts are as follows:

Method 1: creating parts and superparts having operation code similar to that of the original instruction.
 a. Parts: % R2 to % R5 1120
 b. Superparts: % R6 to % R10 1130
Method 2: creating parts and superparts using only "extractelement" and "shufflevectors" instructions, and vector Dummy 1160 which is any vector whose size is the same as that of vector % R1.
 a. Parts: % R11 to % R14 1140
 b. Superparts: % R15 to % R19 1150

In embodiments of the present invention, an Expansion Phase 410 can be followed by a Cleanup Phase 420, the role of which can be to remove the parts and superparts that are invalid. Invalid parts and superparts can include those that have properties that differ from the properties of the original instruction. These properties can include: the number of operands, the type of operation, and others. Invalid parts and superparts can also include results of phi nodes.

In an embodiment of the present invention, the nature of instructions like LLVM's "shufflevector", "insertelement", and "extractelement" instructions, can cause certain parts or superparts to be fully or partially scalarized. For example, for an instruction such as:

$$\text{Inst} = \text{shufflevector} <x,y,z,w><r,t,u,v><0,1,4,5>,$$

the only two (2) superparts that are available for Inst, are:

$$\text{Inst}' = <x,y>, \text{ and}$$

$$\text{Inst}'' = <r,t>$$

A part or super part can be removed if it is invalid/junk. For example, if we are adding 2 vectors A, B which have 2 lanes$<x, y>$ as:

$$C<x,y> = A<x,y> + B<x,y>$$

Valid part/superpart is:

$$C<x> = A<x> + B<x> \text{ or } C<y> = A<y> + B<y>$$

Examples of invalid parts/superpart:

$$C<x>=A<x>+$$

$$C<x>=A<x>+B<x,y>$$

$$C<x>=+$$

We consider a part or super as invalid/junk if it doesn't share properties of the original instruction. Some of those properties can be: number of operands (such as A, B), type of operation we do, having same vector size for all operands (such as C, A, B) etc.

We only have 2 valid superparts. This is because we create superpart ONLY if it has contiguous elements. In our example Inst=shufflevector <x, y, z, w> <r, t, u, v> <0, 1, 4, 5>:
We see that Inst has 4 lanes whose indices are <0, 1, 4, 5>. Here index <0, 1, 2, 3>=<x, y, z, w> and Index <4, 5, 6, 7>=<r, t, u, v>
Therefore, if we say Index has <0, 1, 4, 5>→we are obtaining <x> from index 0,
   <y> form index 1
   <r> from index 4
   <t> from index 5
Therefore, Inst will have=<x, y, r, t>.
Here we see that only <x, y> and <r, t> are contiguous. Therefore, Inst only has 2 superparts.

Because the Inst instruction has only 2 superparts, and each of these superparts have only 2 lanes, any Inst instruction having 3 or 4 lanes is invalid. Consequently, any phi function instruction using an invalid Inst instruction is also invalid. Because parts and superparts do not exist for invalid Inst instructions, a cleanup algorithm is required to remove the invalid Inst instructions, as well as any phi function that may use the invalid Inst instructions. In order to address all instructions that may be a function of invalid Inst instructions, a cleanup algorithm can be performed recursively.

If an instruction such as phi node has junk/incomplete parts or superparts, we need a cleanup algorithm to remove those useless parts and superparts. We need to clean recursively because if some other instruction is using junk phi parts then that instruction should also be removed along with junk phi part. Therefore, if we have several instruction using junk parts/superparts, removing junk parts/superparts only is not sufficient. We should recursively go through all instructions using this junk part/superpart and delete them too.

During the Cleanup Phase 420, all the possible valid parts and superparts for an instruction are cached. In embodiments of the present invention, the data structure to hold or cache the parts of an instruction is structured as in FIG. 12.

Figure 12:
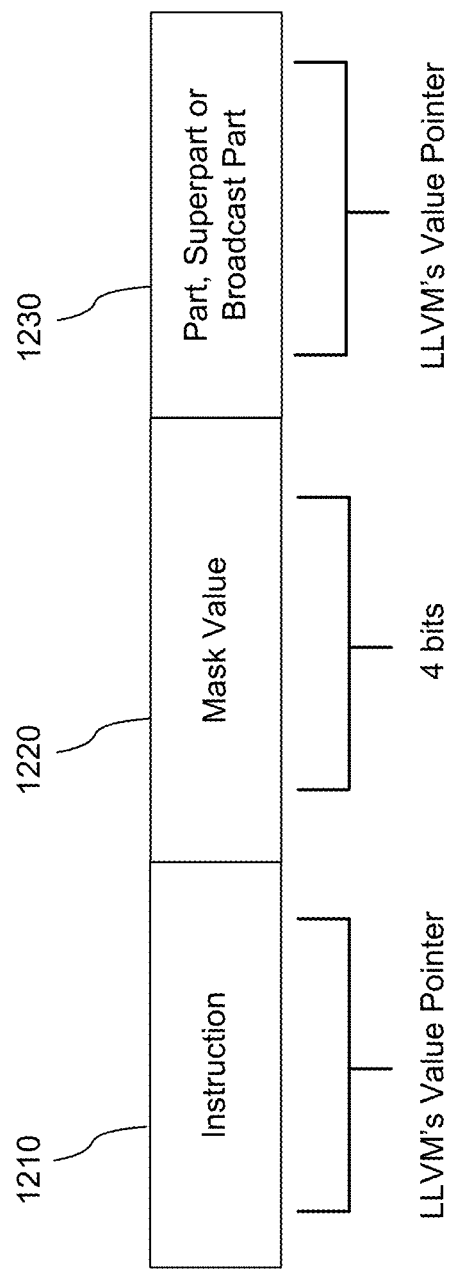
FIG. 12 illustrates an overview of a data structure used to hold and capture all the parts of an instruction, according to an embodiment.

FIG. 12 is an overview of a data structure used to hold and capture all the parts and superparts of an instruction in an embodiment using an LLVM compiler. In FIG. 12, "Instruction" 1210 refers to the instruction whose parts and superparts are to be created, "Mask value" 1220 indicates an identification number for the part or superpart, and "Part or Superpart" 1230 indicates the pointer to the instruction's part or superpart.

In embodiments of the present invention, a Cleanup Phase 420 can be followed with a Placeholder Phase 430. In the Placeholder Phase 430, a mask is created for each part and superpart that remains after the Cleanup Phase 420. For any 4-lane vector, twenty-two (22) is the total number of parts and superparts it can have, of which only ten (10) are unique combination parts and superparts. Because of this, four (4) binary digits are sufficient to denote the mask value of each part or superpart. In a sample embodiment, an original vector has four lanes, and a mask also having four lanes can be used to denote each of the vector's parts and superparts. Each lane of a mask can be allocated one binary digit, so as to correspond with the presence of a lane in the part or superpart it represents. In other words, each binary digit of a 4-lane mask has a value of either 0 or 1, that matches the presence of a lane in the part or superpart it can recreate. For example, a vector having four (4) lanes <x, y, z, w> also has twenty-two (22) parts and superparts, and each of these parts and superparts can be allocated a mask value. The lanes of the mask can match the lanes of the part or superpart. The twenty-two resulting masks are shown in FIG. 2 (i.e.: 0001, 0010, 0100 . . . 1111). In embodiments of the present invention, the dynamic programming method of creating a table of mask values for parts and superparts can work well with existing techniques for SelectionDAG (DAG: dynamic acyclic graph). Further, a placeholder phase as described herein can allow a programmer to do hardware specific optimizations.

FIG. 2 is a table depicting mask values which can be used to identify the parts and superparts 210 of a vector (x, y, z, w). The mask values 220 are numbered successively in binary numbers and converted to decimal numbers for high-level practicality.

In embodiments of the present invention, the Placeholder Phase 430 allows a programming user to gain full control on the instructions and its parts and superparts. Hence, in the Placeholder Phase 430, techniques can be implemented to identify opportunities that are unavailable through other IR optimization passes. One such example can be identifying opportunities to create special instructions, such as floating-point multiply-add (FMAD) operations.

In embodiments of the present invention, a Placeholder Phase 430 can be followed with a Combine-from-Parts Phase 440.

In some embodiments, a Combine-from-Parts Phase 440 can be used for creating parts and smaller superparts, from the largest superparts, and this can be done by using a longest common subsequence technique. For example, if parts or superparts with mask values 3 and 6 have to be created (According to FIG. 2, mask value 3 corresponds to 0011 and superpart <x, y>, and mask value 6 corresponds to 0110 and superpart <y, z>), then the longest common subsequence for 0011 and 0110, is 0111, which in FIG. 2 corresponds to mask value 7 and superpart <x, y, z>. Hence, the largest superpart is chosen as the one whose mask value is 7. From that result, superparts 3 and 6 can then be recreated using instructions such as LLVM's "extractelement" and "shufflevector", or equivalent instructions of another compiler infrastructure.

In some embodiments, a scenario can arise where at least two parts and superparts of a same instruction overlap with each other, and can also be used by at least one subsequent instruction. In these cases, an overlap means that two parts or superparts have at least one common lane. An example is where the superparts of an instruction include <x, y, z> and <y, z>. It can be noted that these two superparts have lanes <y> and <z> in common and hence, they are overlapping lanes. When subsequent instructions use overlapping lanes, duplicate lanes of that instruction exist, and this results in an increased code size. To overcome this deficiency, the superparts of an instruction can be split, and created based on the largest superparts available. For example, if the largest superpart is <x, y, z>, then the overlapping superpart <y, z> can be replaced with a new superpart, defined as "shufflevector <x, y, z>, <undef, undef, undef, <1, 2>". By doing so, the largest superpart of an instruction can be retained, and smaller parts and superparts created from the largest superpart as necessary. This prevents the duplication issue.

In embodiments of the present invention, a Combine-from-Parts Phase 440 can be followed with a Connect-to-Outputs Phase 450.

In some embodiments, a set of vector instructions can include instructions that do not have any parts or superparts. These can include certain special intrinsic functions ("instrinsics"), as well as other output instructions that cannot be split. For an instruction that cannot be split to work as expected, all the parts or superparts of its operands, that might have been created for previous instructions, have to be put together to recreate the original operand. At a Connect-to-Outputs Phase 450, the whole vector is rebuilt, by first inserting the largest superpart of the operand and then filling the missing lanes with the smaller parts or superparts. In this way, the cost of building the whole vector can be minimized.

In an embodiment of the present invention, a set of vector instructions can be optimized by using at least one analysis-guided lane optimization 330. The choice of using one analysis-guided lane optimization 330 over another, of using any number of such optimizations, and of combining similar or different such optimizations, is unique for each optimization goal. However, an analysis-guided optimization can only optimize for one of the subsets of parts and superparts and therefore, in an embodiment of the present invention, the subsets of splats (also known as broadcast parts) is chosen. Further, since a splat vector has the same value across all its lanes, it is straightforward to rebuild an original instruction from a splat vector. In this case, the outputs of analysis-guided optimizations are similar:

1. For each vector instruction, a list of splat vectors determining how a vector is to be split.
2. For each vector instruction, a list of splat vectors determining which parts and superparts must be put back together, and the list should be consistent with 1.

The splats are a special case of superparts. Since an analysis-guided optimization targets very specific problem such as splats, we chose to name it splat instead of superpart. You can say that splat is special case of superpart.

The splats are a subset of superparts. We have 4 scalar parts and 18 superparts. Out of those 18 superparts, all the superparts having same value across all lanes is a splat. For example: If we have a vector A<x, y, z> then:
The scalar parts are:
<x>, <y>, <z>,
the splats are:
<x, x>, <x, x, x>, <y, y>, <y, y, y>, <z, z>, <z, z, z>,
and the superparts are:
<x, x>, <x, x, x>, <y, y>, <y, y, y>, <z, z>, <z, z, z>, <x, y>, <y, z>, <x, y, z>.
So, the splats are a subset of superparts. Since a speculative lane analysis performs several optimizations in a go, it supports all types of parts and superparts, whereas an analysis-guided lane optimization is very specific to a single problem. Hence, analysis-guided lane optimization can only optimize one of the subset of parts/superparts such as splats. So, speculative supports all parts and superparts whereas analysis guided only support splats.

Since splat has same value across all its lanes, we do not need any special logic to put them back together. It is straightforward to put them back. If we have <x>, we put them back by creating a new vector whose values are <x, x>, <x, x, x>, etc. The splat vectors correspond with FIG. 14.

Figure 13:
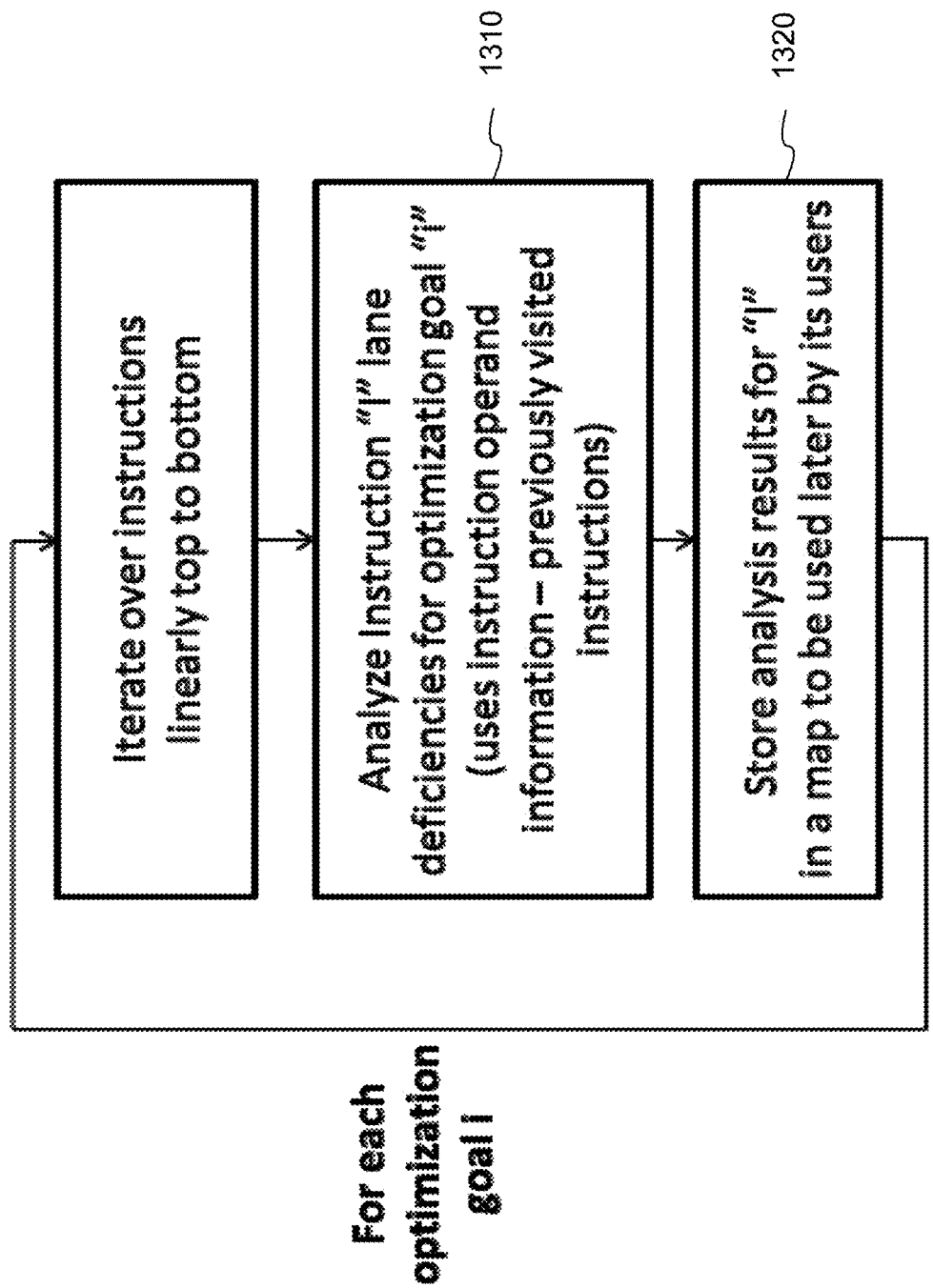
FIG. 13 is a flowchart showing an analysis-guided optimization, in accordance with an embodiment of the present invention.

FIG. 13 illustrates a flow chart in which each instruction of a set of vector instructions is analyzed for an optimization goal 1310, and the analysis result for each instruction is stored in a map, a list, or a table to be used later by subsequent instructions 1320, in accordance with an embodiment.

In an embodiment, dynamic programming can be used to optimize a set of vector instructions, by removing shuffle instructions. The shuffle instructions include move and copy operations that are performed to construct a vector before operations are performed on the vector. The moves are to place values into consecutive hardware registers, before operations are performed on the vectors. Once the lanes of a vector are in consecutive registers, the shuffle instructions are no longer needed and can be removed. Such an analysis-guided lane optimization can be called a "shuffle elimination analysis". An algorithm to perform a shuffle elimination analysis can be the following:

For each ALU operation, for example v4=(v3, s)+(v2, v2):
  Verifying each operand, which in this example include operand 1 "(v3, s)", and operand 2 "(v2, v2)",
  If the operand is a vector built from shuffle operations, a sequence of inserting elements, or other vector building operations,
  Tracking the sequence of registers, and
  Building two 4-bit vectors as follows.
    Using the following vector instruction as an example:

$v4=(v3,s)+(v2,v2)$, the two following 4-bit vectors can be built, where:
  For the "Splat" row, each "1" indicates the lane is the same as previous one, or the start of a new vector chain.
  For the "Subvec" row, each "1" indicates the lane is adjacent to the previous one, or the start of a new vector chain.
  For the (v3, s) operand: For the (v2, v2) operand:

| Splat  | 1 | 0 | 0 | 1 |
| Subvec | 1 | 1 | 1 | 1 |

| Splat  | 1 | 0 | 1 | 0 |
| Subvec | 1 | 1 | 1 | 1 |

Inspecting the masks of all operands to determine how to split the operation in parts and superparts. In this example, operand 1 (v3, $) suggests the mask (3, 1, 0, 0), while operand 2 (v2, v2) suggests the mask (2, 2, 0, 0). Each one of these two masks shows the maximum number of parts, which we know to be 4, because they are 4-lane vectors, as well as the size of its subvectors (its parts and superparts). Combining both of these masks results in the mask (2, 1, 1), which determines the optimal part lengths.
Splitting the operation accordingly (compute the sub-register indices as necessary).
In one embodiment, deciding to always put results back with in a vector of (4, 0, 0, 0). In other embodiments, analyzing usage by subsequent instructions, and generating only the largest common parts, which in this example are (3, 0, 0, 0) and (0, 0, 0, 1) (element 1420 of FIG. 14).
Putting the results in register sequence(s) based on output vectors.

The above algorithm can be repeated recursively, in order to address any nested shuffles (i.e., a vector is built and used to build another vector).

Shuffle or build vector is the process of building a vector from scalar elements (or subvectors) in the intermediate representation. It can be represented in multiple ways Shuffle operation. Build vector operation. A sequence of inserting elements subregisters into a bigger register. All are equivalent representation to the same thing.

First in the example: s represents a scalar value, v3 means a vector of three elements, v2 means a vector of 2 elements. There is a table for each operand of the add operation. Splat=Broadcast (i.e., same scalar value broadcasted into multiple elements). We want to split the operation into largest vectors that still do not lead to extra moves. Each operand may have a different requirement. "Splat row" for each of the 4 lanes, we set it to "1" if the value of the lane is identical to the lane before it, or it is the start of a new vector chain. "Subec row" for each of the 4 lanes, we set it to "1" if the value of the lane is an adjacent element to the lane before it (i.e., they are already produced from a vector operation), or it is the start of a new vector chain.

We wanted to produce largest vector operations that still do not require moves to build the vector. In this example, the 1st operand is vector of 4 elements, three of which are consecutive (coming from a vector operation) and the last one is a scalar—so we need a move to bring the scalar value adjacent to v3 (we need to split to 3, 1) only based on 1st operand. The 2nd operand is also vector of 4 elements, 2 elements are consecutive, then another 2 elements that are consecutive. To be able to eliminate any moves from either operands:

From the prior analysis stage, each operand is represented by a vector determining the length of its parts (consecutive or broadcast elements). The size of this vector represents the maximum possible parts (e.g., 4 in our example).

Find the smallest part size for all operands at index 0.

Revise all other operands to be split according to the smallest part size found in previous step.

Iterate and do this for the second index.

After this process ends (when we visit all indices), we would get the final result vector that determines optimal part lengths.

In an embodiment where we can decide to always put results back with a splat vector of (4, 0, 0, 0), this is to avoid splitting the consumers of this operation as they may be in vector already. Note bringing them back is at no cost (i.e., does not translate to real moves), it just translates to consecutive allocation of registers. If consuming operations are not using them as vectors, we do not have to restrict register allocation and it may be better to not put the result back into a vector.

Figure 14:
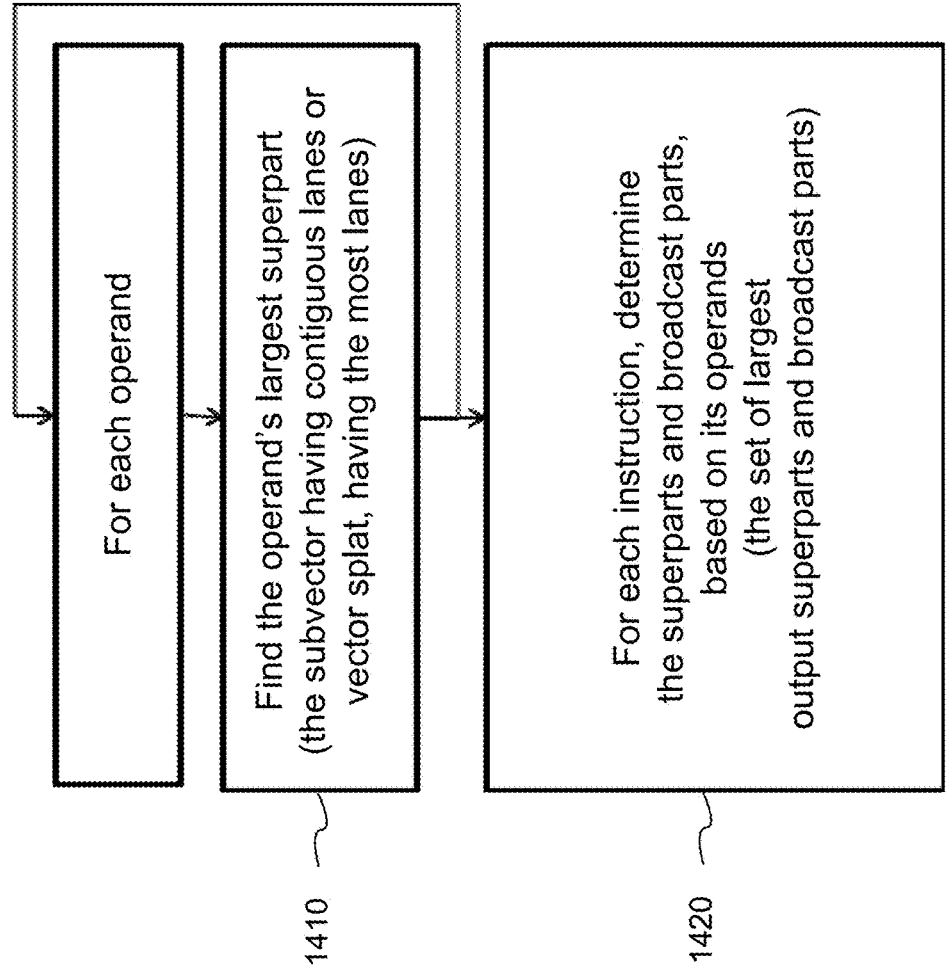
FIG. 14 is a flowchart showing the analysis-guided optimization of a shuffle elimination, in accordance with an embodiment of the present invention.

FIG. 14 illustrates a flow chart for a shuffle elimination analysis using dynamic programming. For each operand of a set of vector instructions, the operand's largest part or superpart is identified 1410, and for each instruction of the set of vector instructions, the superparts of the instruction are determined based on its operands 1420.

In an embodiment, dynamic programming can be used to partially evaluate vector instructions in which at least one operand is a constant, and this can be called a "constant lane analysis". An algorithm to perform a constant lane analysis can be as follows:

Iterating through the operations starting from the beginning of the set of computer instructions, Verifying the operands of each computer instruction that can be computed by the compiler, Querying (i.e. generating) a mask for each operand having a lane whose value is a constant 1510;

From each mask of an operand, computing a constant mask for the output 1520;

Computing the output parts, output superparts, and output broadcast parts 1530;

Storing the mask of each computer instruction into a memory;

Using the mask with all subsequent instructions that can use it.

In one embodiment, propagating the constants on the fly.

Repeating the above for all of the instructions.

Finally, determining the output vector splat for each operation, based on the constant mask of the users.

Figure 15:
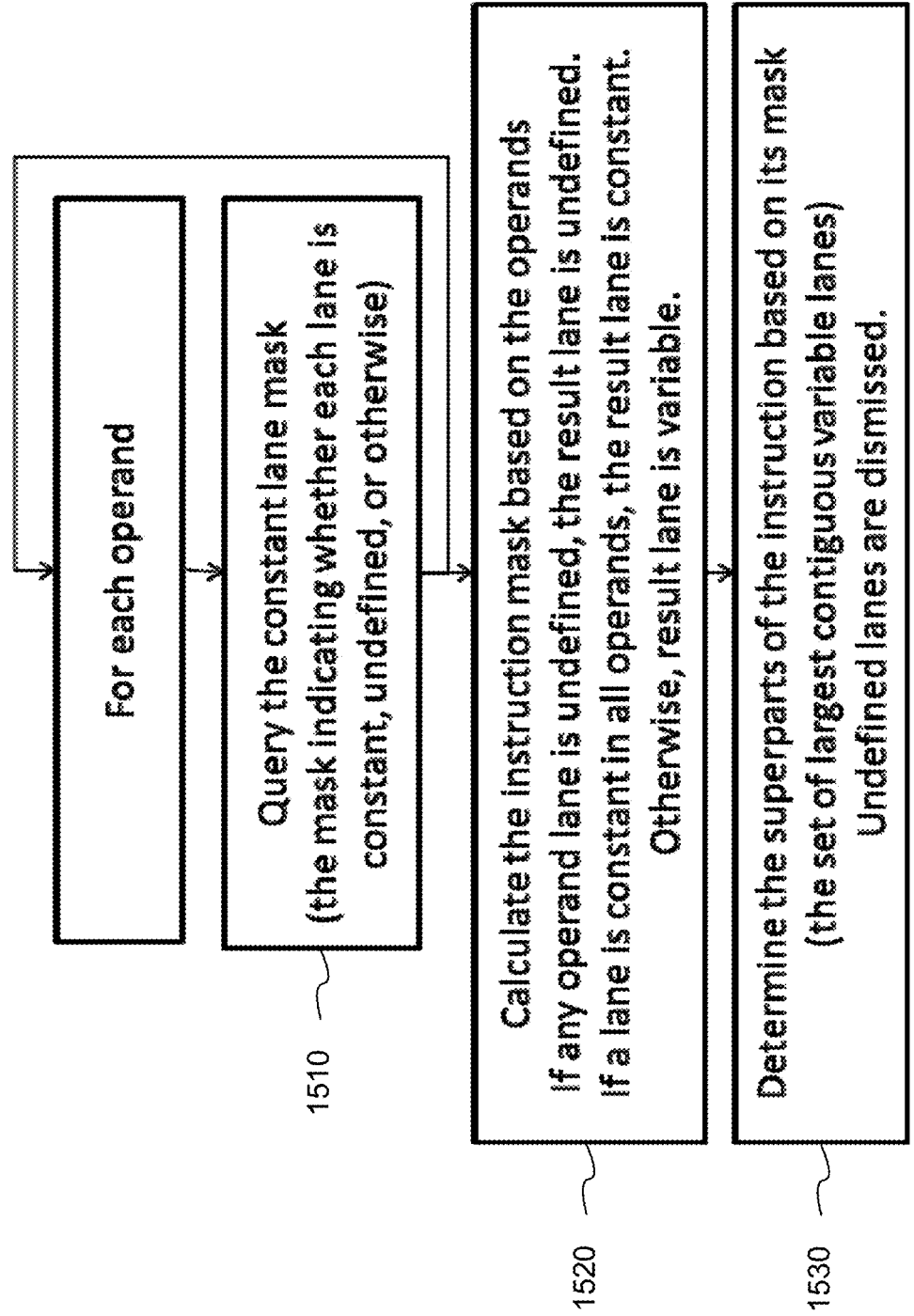
FIG. 15 is a flowchart showing the analysis-guided optimization of a constant/undefined lane, in accordance with an embodiment of the present invention.

FIG. 15 illustrates a flow chart for a constant lane analysis using dynamic programming. For each operand, a constant lane mask is identified 1510, then, an instruction mask is calculated based on the operands 1520, and finally, the instruction's parts and superparts are determined based on the instruction's mask 1530.

In an embodiment, dynamic programming can be used to improve upon the analysis-guided lane optimization known in the art as "partial lane combining analysis" with an algorithm such as the following:

Analysis Phase
  Finding all pairs of instructions that share common lanes.
  Ensuring there are no lane conflicts with other users.
Splitting Phase
  Splitting producing instruction.
  Combining the resulting instructions in a subsequent pass.

In an embodiment of the present invention, dynamic programming can be used to eliminate subexpressions that are common to the lanes of at least one vector. This optimization can be referred to as a "lane common subexpression elimination" (lane-CSE). When multiple lanes of a vector undergo the same operation, this causes redundancies and the lane-CSE optimization is to eliminate such redundancies. As an example, if we have 4-lane wide vectors:

$$A<x,y,z,w>, B<x,y,z,w>, C<x,y,z,w>,$$

as well as:

$$C<x,y,z,w>=A<x,y,z,w>+B<x,y,z,w>$$

$$D<x,y,z>=A<x,y,z>+B<x,y,z>$$

$$E<x,y>=A<x,y>+B<x,y>$$

Here, we see that:
1. $A<x>+B<x>$ is common for C, D, E
2. $A<y>+B<y>$ is common for C, D, E
3. $A<z>+B<z>$ is common for C, D So, the output of a lane-CSE after optimization would look something like this:

$$E<x,y>=A<x,y>+B<x,y>, (same)$$

$$D<x,y,z>=<E<x>,E<y>,A<z>+B<z>>$$

$$C<x,y,z,w>=<D<x>,D<y>,D<z>,A<w>+B<w>>$$

Figure 16:
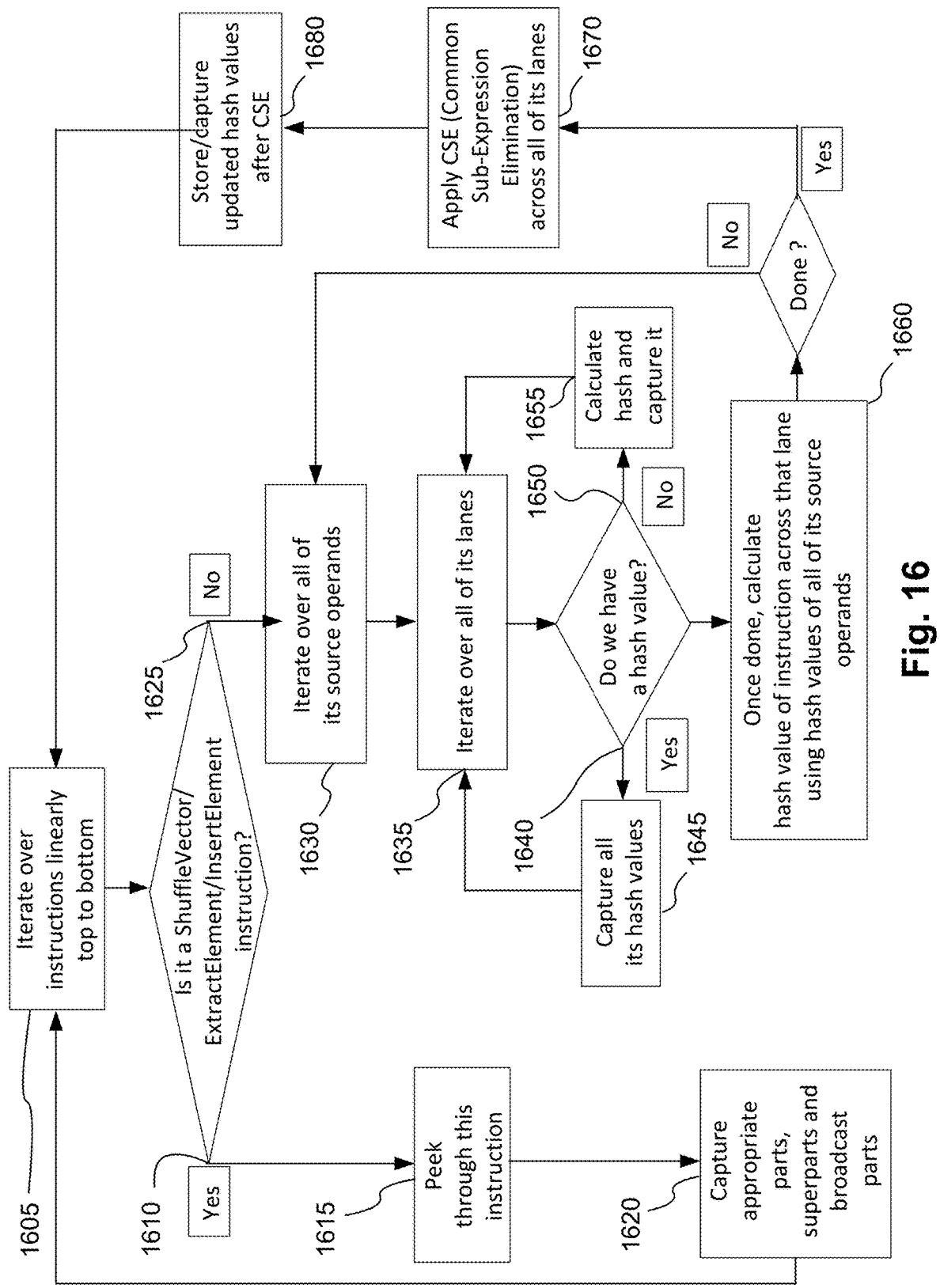
FIG. 16 illustrates an algorithm related to lane-common subexpression elimination (lane-CSE).

FIG. 16 shows an algorithm for applying a lane-CSE optimization to a set of vector instructions, in accordance with an embodiment of the present invention. Given a set of instructions, the instructions should be iterated linearly from top to bottom 1605. If an instruction is 1610 one of a ShuffleVector, ExtractElement or InsertElement instruction, then the method of this embodiment should peek through the instruction 1615 and capture the appropriate parts, superparts and broadcast parts 1620, and then iterate to the next instruction 1605. If the instruction is not 1625 one of a ShuffleVector, ExtractElement or InsertElement instruction, then a method of this embodiment should iterate over all of the instruction's source operands 1630, and iterate over all of its lanes 1635. If there is a hash value 1640, then a method should capture all the hash values 1645 and iterate to the next lane 1635. If there is no hash value 1650, then a method should calculate a hash, capture it 1655, and iterate to the next lane 1635. Once done, a method should calculate a hash value of the instruction across that lane using the hash values of all of its source operands 1660, and iterate over the source operands 1630 until done. Once done, a method should apply a common sub-expression elimination (CSE) across all of its lanes 1670, store/capture the hash values updated after CSE 1680, and finally, iterate to the next instruction 1605.

The present invention includes a method of compiling computer instructions in which a set of computer instructions targeted for execution is received by a processor, each instruction for operating on at least one lane of an input vector having at least one lane; and applying to the set of computer instructions at least one compiler optimization that makes use of dynamic programming techniques. Such method can include creating from a vector a table of subvectors, a subvector including at least one of a part including a single lane of the vector, a superpart including contiguous lanes of the vector, and a broadcast part including lanes having the same value as a lane of the vector.

In an embodiment, a method can include at least one speculative lane optimization, which can be to create from an instruction vector a table of subvectors, the subvectors including at least one of a part, a superpart, and a broadcast part of the instruction vector; removing from the table of subvectors, the subvectors that are not required; creating for each subvector a digital mask that can identify the subvector, and that can recreate the subvector from the instruction vector; creating at least one mask, the lanes of which are a longest common subsequence of lanes from the digital masks of at least two subvectors; generating other subvectors of the table from the subvector having the mask with the longest common subsequence of lanes; and generating an output vector, from the subvectors of the table having useful lanes. In an embodiment, an output vector generated from the subvectors having useful lanes can be generated from only the subvectors having useful lanes.

In an embodiment, a method involving a speculative lane optimization can include at least one optimization, and in the event of a plurality of optimizations, each one can be applied substantially in a same pass, the at least one optimization including at least one of: a dead lane optimization; a shuffle elimination, which refers to the elimination of at least one instruction, including shuffles, used to build vectors in the intermediate representation of a compiler; a constant lane analysis; a lane common subexpression elimination, which refers to the elimination of redundant computations due to many lanes of a same vector undergoing same operations; a lane reduction; and at least one other optimization.

In an embodiment, a dead lane elimination can include an elimination of dead lanes resulting from phi functions, which are also known as phi nodes.

In an embodiment, a speculative lane optimization can include at least one threshold parameter allowing control over the degree of speculation, according to custom requirements.

In an embodiment, a compiler optimization can include an analysis-guided lane optimization, and such optimization can include the following steps: selecting an analysis-guided optimization (or a problem to analyze), creating a mask vector for the computer instructions, that corresponds to the selected analysis-guided optimization; creating with the mask vector the parts, superparts, and broadcast parts, that are to be used by the computer instructions causing the selected optimization problem; creating with the parts, superparts, and broadcast parts, the output of the computer instructions, as output parts, output superparts, and output broadcast parts; creating an output vector based on the output parts, output superparts, and output broadcast parts.

In an embodiment, an analysis-guided optimization can be a shuffle elimination, and the optimization can include, for each operand of a set of instructions, determining the largest subvector, and for each instruction, determining the subvectors based on its operands.

In an embodiment, an analysis-guided optimization can be a constant propagation, and in a further embodiment, a constant can be propagated during the same pass as when a mask is generated.

In an embodiment, an analysis-guided optimization can be a constant lane analysis and in such an embodiment, it can include, for each instruction: verifying each operand; creating for each operand a mask for the lane whose value is a constant number; calculating an instruction mask based on the operands; determining parts, superparts and broadcast parts of the instruction based on the instruction mask; storing the instruction mask in a memory; using, by the subsequent instructions, the instruction mask where it can be used.

In an embodiment, an analysis-guided optimization can be a partial lane combining analysis, and such an embodiment can include: identifying in a set of computer instructions, all occurrences where two instructions have a common lane; ensuring that for each occurrence of two instructions having a common lane, there are no lane conflicts with subsequent instructions using one of the two instructions having a common lane; creating parts, superparts and broadcast parts for the two instructions have a common lane, based on their common lanes; combining in a subsequent pass the parts, superparts and broadcast parts of the two instructions have a common lane, into resulting instructions.

In an embodiment, an analysis-guided optimization can be a lane constant subexpression elimination (lane-CSE), and in a further embodiment, a lane constant subexpression elimination can include: iterating over the instructions of a set of instructions; capturing the parts, superparts and broadcast parts, for each ShuffleVector, ExtractElement, and InsertElement instruction; iterating over the source operands of the instruction; iterating over the lanes; calculating a hash value where needed and capturing each hash value; calculating a hash value of the instruction across each lane using hash values of all of its source operands; applying a common subexpression elimination across all of its lanes; storing and capturing the hash values, updated after the common subexpression elimination.

In an embodiment of the present invention, the processor 1710 is flexible in that it has hardware support for at least one vector having an arbitrary number of lanes up to at least four, it has hardware support for the reading and extraction of individual vector lanes, it has hardware support for the reading and extraction of contiguous vector lanes, and it has hardware support for the reading and extraction of broadcast vectors lanes.

In an embodiment of the present invention, the processor 1710 is operative for: receiving a set of computer instructions targeted for execution, each instruction for operating on at least one lane of an input vector having at least one lane; and applying to the set of computer instructions at least one compiler optimization that makes use of dynamic programming techniques.

In an embodiment of the present invention, the processor 1710 is operative during compilation to apply dynamic programming techniques including creating from a vector a table of subvectors, a subvector including at least one of a part including a single lane of the vector, a superpart including contiguous lanes of the vector, and a broadcast part including lanes having the same value as a lane of the vector.

Figure 17:
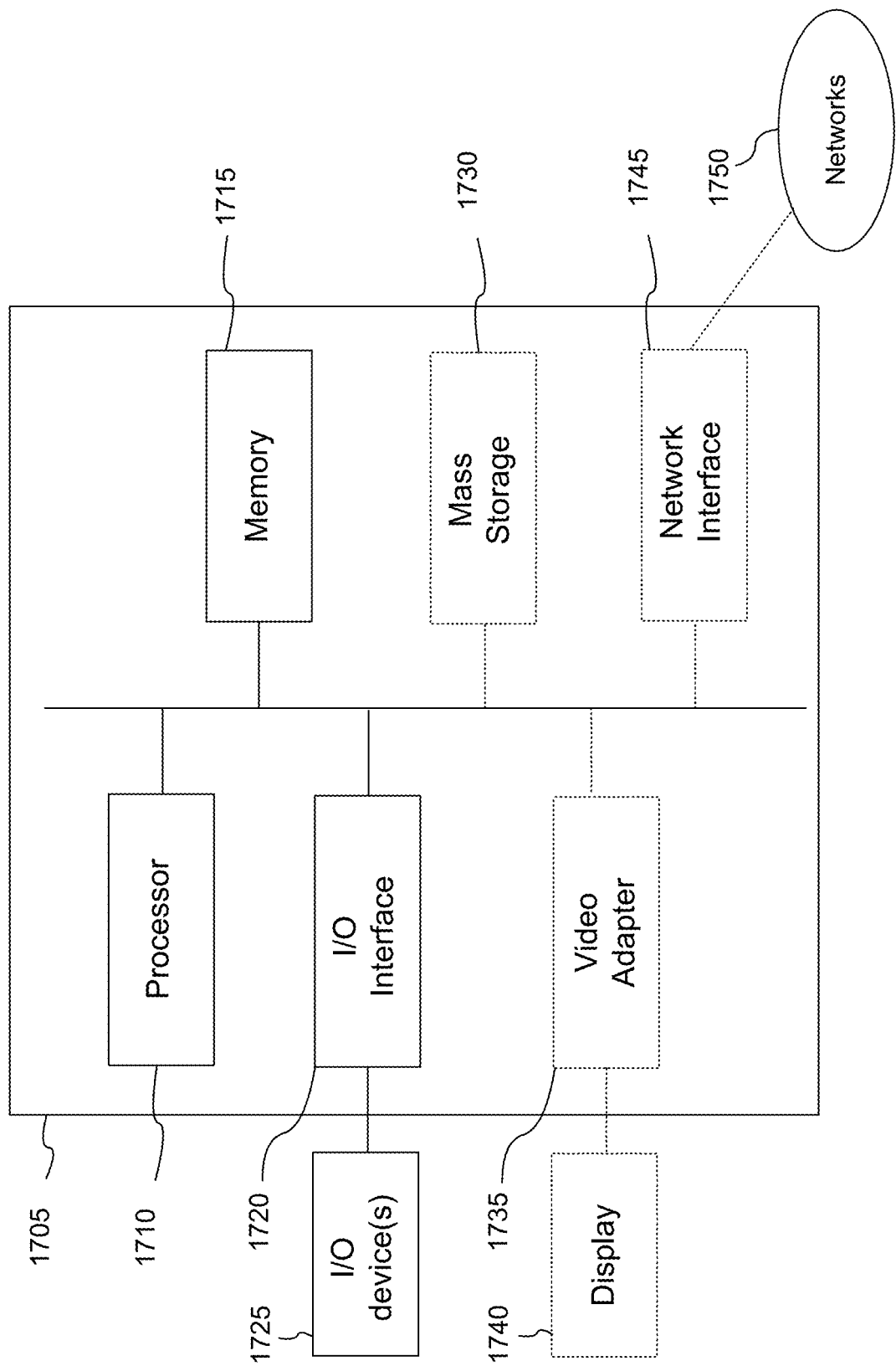
FIG. 17 illustrates typical computer hardware that can be used to implement embodiments of the present invention.

FIG. 17 is a representation of hardware 1705 on which embodiments of the present invention can be implemented. A processor 1710 can be used to process, compile and optimize instructions before their actual execution, and a same processor 1710 can also be used to execute the instructions once they have been compiled and optimized. Other conventional computer hardware can be used to support the compilation and optimization process, including but not limited to at least one each of a memory 1715, an input/output device 1725, mass storage 1730, a video adapter 1735, a display 1740, a network interface 1745 and networks 1750.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, tablet, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Embodiments include a method of compiling computer instructions in which a processor receives a set of computer instructions targeted for execution on a processor, each instruction for operating on at least one lane of an input vector having at least one lane; and the processor applies at least one compiler optimization making use of dynamic programming techniques to the set of computer instructions.

Embodiments include a method of compiling computer instructions with dynamic programming techniques that include creating from a vector a table of subvectors, a subvector including at least one of a part including a single lane of the vector, a superpart including contiguous lanes of the vector, and a broadcast part including lanes having the same value as a lane of the vector.

Embodiments include a method of compiling computer instructions including applying at least one speculative lane optimization.

Embodiments include a method of compiling computer instructions including applying at least one speculative lane optimization that includes creating from an instruction vector a table of subvectors, the subvectors including at least one of a part, a superpart, and a broadcast part of the instruction vector; removing from the table of subvectors, the subvectors that are not required; creating for each subvector a digital mask that can identify the subvector, and that can recreate the subvector from the instruction vector; creating at least one mask, the lanes of which are a longest common subsequence of lanes from the digital masks of at least two subvectors; generating other subvectors of the table from the subvector having the mask with the longest common subsequence of lanes; and generating an output vector, from the subvectors of the table having useful lanes.

Embodiments include applying at least one speculative lane optimization where the output vector generated from the subvectors having useful lanes is generated from only the subvectors having useful lanes.

Embodiments include applying at least one speculative lane optimization, each of which is applied substantially in a same pass, the at least one optimization including at least one of: a dead lane elimination; a shuffle elimination, which refers to the elimination of at least one instruction, including shuffles, used to build vectors in the intermediate representation of a compiler; a constant lane analysis; a partial lane combining analysis; a lane common subexpression elimination, which refers to the elimination of redundant computations due to many lanes of a same vector undergoing same operations; a lane reduction; and at least one other optimization.

Embodiments include applying a speculative lane optimization that eliminates dead lanes resulting from phi functions, also known as phi nodes.

Embodiments include applying a speculative lane optimization that includes at least one threshold parameter allowing control over the degree of speculation, according to custom requirements.

Embodiments include applying at least one compiler optimization that is an analysis-guided lane optimization.

Embodiments include applying at least one analysis-guided lane optimization by: selecting an analysis-guided optimization; creating a mask vector for the computer instructions to be optimized, that corresponds to the selected analysis-guided optimization; creating with the mask vector the parts, superparts, and broadcast parts, that are to be used by the computer instructions causing the selected optimization problem; creating with the parts, superparts, and broadcast parts, the output of the computer instructions, as output parts, output superparts, and output broadcast parts; creating an output vector based on the output parts, output superparts, and output broadcast parts.

Embodiments include applying at least one analysis-guided optimization that is a shuffle elimination, and that includes: for each operand of a set of instructions, determining the largest subvector; and for each instruction, determining the subvectors based on its operands.

Embodiments include applying at least one analysis-guided optimization that is a constant propagation.

Embodiments include applying at least one analysis-guided optimization that is a constant propagation, where a constant is propagated during the same pass as when a mask is generated.

Embodiments include applying at least one analysis-guided optimization that is a constant lane analysis and includes, for each instruction: verifying each operand; creating for each operand a mask for the lane whose value is a constant number; calculating an instruction mask based on the operands; determining parts, superparts and broadcast parts of the instruction based on the instruction mask; storing the instruction mask in a memory; and using, by the subsequent instructions, the instruction mask where it can be used.

Embodiments include applying at least one analysis-guided optimization that is a partial lane combining analysis and includes: identifying in the set of computer instructions, all occurrences where two instructions have a common lane; ensuring that for each occurrence of two instructions having a common lane, there are no lane conflicts with subsequent instructions using one of the two instructions having a common lane; creating parts, superparts and broadcast parts for the two instructions having a common lane, based on their common lanes; combining in a subsequent pass the parts, superparts and broadcast parts of the two instructions having a common lane, into resulting instructions.

Embodiments include applying at least one analysis-guided optimization that is a lane constant subexpression elimination (lane-CSE).

Embodiments include applying at least one analysis-guided optimization that is a lane constant subexpression elimination (lane-CSE) and includes: iterating over the instructions of a set of instructions; capturing the parts, superparts and broadcast parts, for each ShuffleVector, ExtractElement, and InsertElement instruction; iterating over the source operands of the instruction; iterating over the lanes; calculating a hash value where needed and capturing each hash value; calculating a hash value of the instruction across each lane using hash values of all of its source operands; applying a common subexpression elimination across all of its lanes; storing and capturing the hash values updated after the common subexpression elimination.

Embodiments include a computer processor operative to compile instructions, the computer processor including hardware support for at least one vector having an arbitrary number of lanes up to at least four, hardware support for the reading and extraction of individual vector lanes, hardware support for the reading and extraction of contiguous vector lanes, hardware support for the reading and extraction of broadcast vectors lanes; and the computer processor being operative for: receiving a set of computer instructions targeted for execution, each instruction for operating on at least one lane of an input vector having at least one lane; and applying to the set of computer instructions at least one compiler optimization that makes use of dynamic programming techniques.

Embodiments include a computer processor that is operative during compilation to apply dynamic programming techniques including creating from a vector a table of subvectors, a subvector including at least one of a part including a single lane of the vector, a superpart including contiguous lanes of the vector, and a broadcast part including lanes having the same value as a lane of the vector.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method of compiling computer instructions comprising:
receiving a set of computer instructions targeted for execution on a processor, each computer instruction for operating on at least one lane of an input vector having the at least one lane; and
applying to the set of computer instructions at least one compiler optimization that makes use of dynamic programming techniques, the dynamic programming techniques including creating, from a vector a table of subvectors, a subvector including at least one of a part including a single lane of the vector, a superpart including contiguous lanes of the vector, and a broadcast part including lanes having the same value as a lane of the vector, the at least one compiler optimization including a speculative lane optimization that comprises:
creating, from an instruction vector, a table of subvectors, the subvectors including at least one of a part, a superpart, and a broadcast part of the instruction vector;
removing from the table of subvectors, the subvectors that are not required;
creating for each subvector a digital mask to identify the subvector and to recreate the subvector from the instruction vector;
creating at least one mask, the lanes of the at least one mask are a longest common subsequence of lanes from the digital masks of at least two subvectors;
generating other subvectors of the table from the subvector having the at least one mask with the longest common subsequence of lanes; and
generating an output vector from the subvectors of the table having useful lanes.

2. The method of claim 1, where the output vector generated from the subvectors having useful lanes is generated from only the subvectors having useful lanes.

3. The method of claim 1, wherein the speculative lane optimization includes at least one optimization, applied in a same pass, the at least one optimization including at least one of:
a dead lane elimination;
a shuffle elimination, which refers to the elimination of at least one computer instruction, including shuffles, used to build vectors in the intermediate representation of a compiler;
a constant lane analysis;
a partial lane combining analysis;
a lane common subexpression elimination, which refers to the elimination of redundant computations due to many lanes of a same vector undergoing same operations;
a lane reduction; and
at least one other optimization.

4. The method of claim 3, wherein the dead lane elimination includes elimination of dead lanes resulting from phi functions or phi nodes.

5. The method of claim 1, wherein the speculative lane optimization includes at least one threshold parameter allowing control over a degree of speculation.

6. The method of claim 1, wherein the at least one compiler optimization includes an analysis-guided lane optimization.

7. The method of claim 6, the analysis-guided lane optimization comprising:
selecting an analysis-guided optimization;
creating a mask vector for the computer instructions, that corresponds to the selected analysis-guided optimization;
creating, with the mask vector, parts, superparts, and broadcast parts configured to be used by the computer instructions;
creating with the parts, the superparts, and the broadcast parts, the output of the computer instructions, as output parts, output superparts, and output broadcast parts; and
creating an output vector based on the output parts, the output superparts, and the output broadcast parts.

8. The method of claim 6, wherein an analysis-guided optimization is a shuffle elimination, and further comprises:
for each operand of the set of computer instructions, determining a largest subvector; and
for each computer instruction, determining the subvectors based on operands.

9. The method of claim 6, wherein an analysis-guided optimization is a constant propagation.

10. The method of claim 9, wherein a constant is propagated during the same pass as when a mask is generated.

11. The method of claim 6, the analysis-guided optimization being a constant lane analysis optimization and further comprising, for each computer instruction:
verifying each operand;
creating for each operand an operand mask for the lane whose value is a constant number;
calculating an instruction mask based on the operands;
determining parts, superparts and broadcast parts of the instruction based on the instruction mask;
storing the instruction mask in a memory; and
using, by the subsequent instructions, the instruction mask where it can be used.

12. The method of claim 6, the analysis-guided optimization being a partial lane combining analysis and further comprising:
identifying, in the set of computer instructions, all occurrences where two computer instructions have a common lane;
ensuring that for each occurrence of the two computer instructions having the common lane, there are no lane conflicts with subsequent instructions using one of the two computer instructions having the common lane;
creating parts, superparts and broadcast parts for the two computer instructions having the common lane; and
combining in a subsequent pass the parts, the superparts and the broadcast parts of the two computer instructions having the common lane, into resulting instructions.

13. The method of claim 6, wherein the analysis-guided optimization is a lane constant subexpression elimination (lane-CSE).

14. The method of claim 13, the method further comprising:
iterating over the computer instructions of the set of computer instructions;
capturing the parts, superparts and broadcast parts, for each ShuffleVector, ExtractElement, and InsertElement instruction;
iterating over the source operands of the computer instructions;
iterating over the lanes;
calculating a hash value where needed and capturing each hash value;
calculating a hash value of the computer instructions across each lane using hash values of all source operands of the computer instructions;
applying a common subexpression elimination across all lanes; and
storing and capturing the hash values updated after the common subexpression elimination to generate the lane constant subexpression elimination (lane-CSE).

15. The method of claim 1, wherein the speculative lane optimization includes at least one threshold parameter allowing control over a degree of speculation, according to custom requirements.

16. The method of claim 1, wherein the at least one compiler optimization includes an analysis-guided lane optimization.

17. An apparatus for compiling computer instructions, comprising:
a memory storing instructions; and
at least one processor in communication with the memory, the at least one processor configured, upon execution of the instructions, to perform the following steps:
receiving a set of computer instructions targeted for execution on a processor, each computer instruction for operating on at least one lane of an input vector having the at least one lane; and
applying to the set of computer instructions at least one compiler optimization that makes use of dynamic programming techniques, the dynamic programming techniques including creating, from a vector a table of subvectors, a subvector including at least one of a part including a single lane of the vector, a superpart including contiguous lanes of the vector, and a broadcast part including lanes having the same value as a lane of the vector, the at least one compiler optimization including a speculative lane optimization that comprises:
creating, from an instruction vector, a table of subvectors, the subvectors including at least one of a part, a superpart, and a broadcast part of the instruction vector;
removing from the table of subvectors, the subvectors that are not required;

creating for each subvector a digital mask to identify the subvector and to recreate the subvector from the instruction vector;

creating at least one mask, the lanes of the at least one mask are a longest common subsequence of lanes from the digital masks of at least two subvectors;

generating other subvectors of the table from the subvector having the mask with the longest common subsequence of lanes; and generating an output vector from the subvectors of the table having useful lanes.

* * * * *